United States Patent
Seregin et al.

(10) Patent No.: US 9,325,991 B2
(45) Date of Patent: Apr. 26, 2016

(54) MOTION VECTOR ROUNDING

(71) Applicant: QUALCOMM Incorporated, San Diego, CA (US)

(72) Inventors: Vadim Seregin, San Diego, CA (US); Jianle Chen, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 13/860,460

(22) Filed: Apr. 10, 2013

(65) Prior Publication Data

US 2013/0272410 A1    Oct. 17, 2013

Related U.S. Application Data

(60) Provisional application No. 61/623,037, filed on Apr. 11, 2012, provisional application No. 61/623,470, filed on Apr. 12, 2012, provisional application No. 61/636,529, filed on Apr. 20, 2012, provisional application No. 61/637,216, filed on Apr. 23, 2012.

(51) Int. Cl.
   *H04N 7/36*     (2006.01)
   *H04N 19/51*    (2014.01)
   (Continued)

(52) U.S. Cl.
   CPC ....... *H04N 19/00587* (2013.01); *H04N 19/176* (2014.11); *H04N 19/42* (2014.11); *H04N 19/51* (2014.11); *H04N 19/513* (2014.11); *H04N 19/52* (2014.11); *H04N 19/523* (2014.11)

(58) Field of Classification Search
   CPC ............ H04N 19/00587; H04N 19/52; H04N 19/176; H04N 19/523; H04N 19/513; H04N 19/42; H04N 19/51
   USPC ................................ 374/240.16; 375/240.16
   See application file for complete search history.

(56) References Cited

U.S. PATENT DOCUMENTS

| 7,280,599 B2 | 10/2007 | Karczewicz et al. |
| 7,660,471 B2 | 2/2010 | Bjontegaard et al. |

(Continued)

FOREIGN PATENT DOCUMENTS

| WO | 03043344 A2 | 5/2003 |
| WO | 2005053312 A1 | 6/2005 |

OTHER PUBLICATIONS

Alshina, et al., "CE3: The Worst Case Memory Band-Width Reduction by 2D->1D Interpolation Replacement (from Samsung)", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T Sg.16); XP030110764, 8 pp.

(Continued)

*Primary Examiner* — Christopher S Kelley
*Assistant Examiner* — Zhihan Zhou
(74) *Attorney, Agent, or Firm* — Shumaker & Sieffert, P.A.

(57) ABSTRACT

A video decoder determines, based at least in part on a size of a prediction unit (PU), whether to round either or both a horizontal or a vertical component of a motion vector of the PU from sub-pixel accuracy to integer-pixel accuracy. The video decoder generates, based at least in part on the motion vector, a predictive sample block for the PU and generates, based in part on the predictive sample block for the PU, a reconstructed sample block.

48 Claims, 7 Drawing Sheets

(51) Int. Cl.
*H04N 19/52* (2014.01)
*H04N 19/176* (2014.01)
*H04N 19/513* (2014.01)
*H04N 19/42* (2014.01)
*H04N 19/523* (2014.01)

(56) References Cited

U.S. PATENT DOCUMENTS

| | | | |
|---|---|---|---|
| 2007/0133687 A1 | 6/2007 | Wittmann et al. | |
| 2009/0257499 A1 | 10/2009 | Karczewicz et al. | |
| 2012/0236941 A1* | 9/2012 | Lin et al. | 375/240.16 |
| 2012/0294370 A1* | 11/2012 | Chiu et al. | 375/240.16 |
| 2013/0287111 A1* | 10/2013 | Xu et al. | 375/240.16 |

OTHER PUBLICATIONS

Bross et al., "High Efficiency Video Coding (HEVC) Text Specification Draft 10 (For FDIS & Last Call)," 12th Meeting: Geneva, CH, Jan. 14-23, 2013, JCTVC-L1003_v34, 310 pp.

Bross et al., "High Efficiency Video Coding (HEVC) Text Specification Draft 7," 9th Meeting: Geneva, CH, Apr. 27,-May 7, 2012, JCTVC-I1003_d2, 290 pp.

Bross et al., "High Efficiency Video Coding (HEVC) Text Specification Draft 8," 10th Meeting: Stockholm, SE, Jul. 11-20, 2012, JCTVC-J1003_d7, 261 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High Efficiency Video Coding (HEVC) Text Specification Draft 6," 8th Meeting: San Jose, CA, USA, Feb. 1-10, 2012, JCTVC-H1003, 259 pp.

Bross et al., "High Efficiency Video Coding (HEVC) Text Specification Draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chujoh, et al., "AHG07: A Restriction of Motion Vector for Small PU Size", JCT-VC Meeting; MPEG Meeting; Jan. 2, 2012-Oct. 2, 2012; San Jose; (Joint Collaborative Team on Video Coding of ISO/IEC JTC1/SC29/WG11 and ITU-T SG.16); XP030111208, 3 pp.

Chujoh "AHG7: A Restriction of Motion Vector for Small PU Size", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16); Apr. 16, 2012, XP030111838, 4 pp.

International Preliminary Report on Patentability—PCT/US2013/036123, The International Bureau of WIPO—Geneva, Switzerland, Jul. 21, 2014, 13 pp.

International Search Report and Written Opinion—PCT/US2013/036123—ISA/EPO—Nov. 12, 2013, 27 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

McCann et al., "High Efficiency Video Coding (HEVC) Test Model 5 (HM 5) Encoder Description", JCT-VC Meeting; PEG Meeting; Nov. 21, 2011-Nov. 30, 2011; Geneva; (Joint Collaborative Team on Video Coding (JCT-VC) of ISO/IEC JTC1/SC29/WG11 and ITU-T SG.16); URL:http://wftp3.itu.int/av-arch/jctvc-site/, No. JCTVC-G1102, XP03011103, 45 pp.

Partial International Search Report—PCT/US2013/036123—ISA/EPO—Jul. 22, 2013, 11 pp.

Seregin, et al., "AHG7: Motion Vector Rounding for the Worst Case Bandwidth Reduction", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16); Apr. 17, 2012, XP030112114, 5 pp.

Ugur, et al., "Appendix to Description of Video Coding Technology Proposal by Tandberg, Nokia, Ericsson", Joint Collaborative Team on Video Coding (JCT-VC) of ITU-T SG16 WP3 and ISO/IEC JTC1/SC291 W11 1st Meeting, No. JCTVC-A119 Appendix, Apr. 15-23, 2010, pp. 1-55, XP030007563, Dresden, DE ISSN: 0000-0049.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion from International Application No. PCT/US2013/036123, dated Apr. 14, 2014, 12 pp.

Ugur, et al., "Description of Video Coding Technology Proposal by Tandberg, Nokia, Ericsson", Joint Collaborative Team on Video Coding (JCT-VC) of ITU-T SG16 WP3 and ISO/IEC JTC1/SC29/W11 1st Meeting, No. JCTVC-A119, Apr. 15-23, 2010, pp. 33.

Response to Written Opinion mailed Nov. 12, 2013, from international application No. PCT/US2013/036123, dated Feb. 3, 2014, 34 pp.

Response to Second Written Opinion mailed Apr. 14, 2014, from international application No. PCT/US2013/036123, dated Jun. 10, 2014, 35 pp.

\* cited by examiner

MOTION VECTOR ROUNDING

This application claims the benefit of:

U.S. Provisional Patent Application No. 61/623,037, filed Apr. 11, 2012,

U.S. Provisional Patent Application No. 61/623,470, filed Apr. 12, 2012,

U.S. Provisional Patent Application No. 61/636,529, filed Apr. 20, 2012, and

U.S. Provisional Patent Application No. 61/637,216, filed Apr. 23, 2012, the entire content of each of which is incorporated herein by reference.

TECHNICAL FIELD

This disclosure relates to video coding and compression and, in particular, to coding of motion vectors.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

SUMMARY

In general, this disclosure describes techniques for processing motion vectors in video coding. More specifically, a video decoder may determine, based at least in part on a size of a prediction unit (PU), whether to round either or both of a horizontal or a vertical component of a motion vector of the PU from sub-pixel accuracy to integer-pixel accuracy. In some examples, the video decoder may round motion vectors indicated by candidates in merge candidate lists and/or advanced motion vector prediction (AMVP) candidate lists for the PU. The video decoder may generate, based at least in part on the motion vector, a predictive sample block for the PU. The video decoder may generate, based in part on the predictive sample block for the PU, a reconstructed sample block.

In one example, this disclosure describes a method of decoding video data. The method comprises, in response to determining that a current PU has a particular size, rounding a motion vector. Rounding the motion vector comprises rounding at least one of a horizontal component or a vertical component of a motion vector from sub-pixel accuracy to integer-pixel accuracy. The method also comprises generating, based at least in part on the motion vector, a predictive sample block for the current PU. Furthermore, the method comprises generating, based in part on the predictive sample block for the current PU, a reconstructed sample block.

In another example, this disclosure describes a method of encoding video data. The method comprises, in response to determining that a current PU has a particular size, rounding a motion vector. Rounding the motion vector comprises rounding at least one of a horizontal component or a vertical component of a motion vector from sub-pixel accuracy to integer-pixel accuracy. Furthermore, the method comprises generating, based at least in part on the motion vector, a predictive sample block for the current PU. In addition, the method comprises generating, based in part on the predictive sample block for the current PU, a residual sample block for the current PU. The method also comprises signaling, in a bitstream, the residual sample block for the current PU.

In another example, this disclosure describes a video coding device comprising one or more processors configured to round, in response to determining that a current PU has a particular size, at least one of a horizontal component or a vertical component of a motion vector from sub-pixel accuracy to integer-pixel accuracy. The one or more processors are also configured to generate, based at least in part on the motion vector, a predictive sample block for the current PU.

In another example, this disclosure describes a video coding device comprising means for rounding, in response to determining that a current PU has a particular size, a motion vector such that at least one of a horizontal component or a vertical component of a motion vector is rounded from sub-pixel accuracy to integer-pixel accuracy. The video coding device also comprises means for generating, based at least in part on the motion vector, a predictive sample block for the current PU.

In another example, this disclosure describes a computer-readable storage medium having instructions stored thereon that, when executed, configure the video coding device to round, in response to determining that a current PU has a particular size, a motion vector such that at least one of a horizontal component or a vertical component of a motion vector is rounded from sub-pixel accuracy to integer-pixel accuracy. In addition, the instructions configure the video coding device to generate, based at least in part on the motion vector, a predictive sample block for the current PU.

The details of one or more examples of the disclosure are set forth in the accompanying drawings and the description below. Other features, objects, and advantages will be apparent from the description, drawings, and claims.

DETAILED DESCRIPTION

Figure 1:
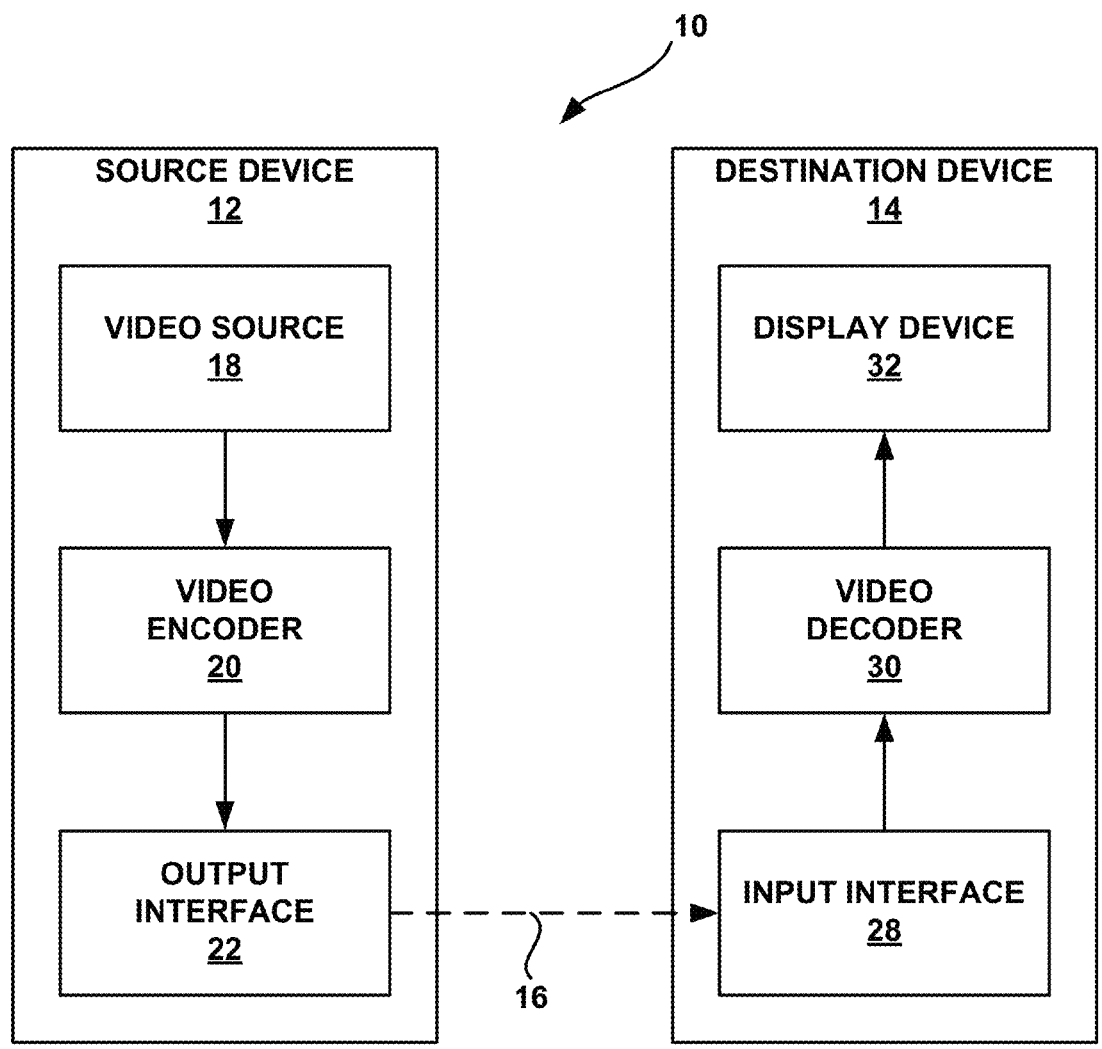
FIG. 1 is a block diagram illustrating an example video coding system that may utilize the techniques of this disclosure.

In HEVC, each picture is divided into a set of equally-sized regions referred to as coding tree blocks (CTBs). Each CTB is associated with a coding tree unit (CTU). The region associated with a CTU may be subdivided according to a quadtree sub-division process into one or more regions associated with coding units (CUs). Each region associated with a CU may be subdivided into one or more regions associated with prediction units (PUs).

A video encoder may generate predictive sample blocks for each PU. The video encoder may use intra prediction or inter prediction to generate the predictive sample blocks for a PU. When using intra prediction, the video encoder may use samples of neighboring blocks of the current picture to generate the predictive sample blocks for the PU.

Inter prediction may be uni-directional inter prediction (i.e., uni-prediction) or bi-directional inter prediction (i.e., bi-prediction). To perform uni-prediction or bi-prediction, the video encoder may generate a first reference picture list (RefPicList0) and a second reference picture list (RefPicList1) for a current slice. Each of the reference picture lists may include one or more reference pictures. When using uni-prediction, the video encoder may search the reference pictures in either or both RefPicList0 and RefPicList1 to determine a reference location within a reference picture. Furthermore, when using uni-prediction, the video encoder may generate, based at least in part on samples corresponding to the reference location, the predictive sample blocks for the PU. Moreover, when using uni-prediction, the video encoder may generate a single motion vector (MV) that indicates a spatial displacement between a sample block of the PU and the reference location. To indicate the spatial displacement between a sample block of the PU and the reference location, a MV may include a horizontal component specifying a horizontal displacement between the sample block of the PU and the reference location and may include a vertical component specifying a vertical displacement between the sample block of the PU and the reference location.

When using bi-prediction to encode a PU, the video encoder may determine a first reference location in a reference picture in RefPicList0 and a second reference location in a reference picture in RefPicList1. The video encoder may then generate, based at least in part on samples corresponding to the first and second reference locations, the predictive sample blocks for the PU. Moreover, when using bi-prediction to encode the PU, the video encoder may generate a first MV indicating a spatial displacement between a sample block of the PU and the first reference location and a second MV indicating a spatial displacement between the sample block of the PU and the second reference location.

After generating predictive sample blocks for the PUs of a CU, the video encoder may generate residual blocks by subtracting the original sample blocks of the CU from the predictive sample blocks for the PUs of the CU. The video encoder may transform samples of the residual blocks, quantize the resulting transform coefficients, and entropy encode syntax elements representing the quantized transform coefficients. The video encoder may output a bitstream that includes the entropy-encoded syntax elements.

A video decoder may use the MV or MVs of PUs to generate predictive sample blocks for the PUs. The video decoder may add the predictive sample blocks for PUs of a CU to the residual blocks for the CU to reconstruct the original sample blocks of the CU. By reconstructing the original sample blocks of each CU of a picture, the video decoder may reconstruct the picture.

An MV may indicate a position that exactly corresponds to a pixel of a reference picture. In this example, the MV is said to have "full-pixel" accuracy or "integer-pixel" accuracy. This disclosure may refer to an MV that has integer-pixel accuracy as an integer-pixel MV. In some instances, the term "pixel" may be shortened to "pel."

Furthermore, an MV may indicate a location that is between two pixels of a reference picture. In other words, an MV may indicate a sub-pixel location within the reference picture. For example, an MV may indicate a location that is halfway between two pixels of a reference picture, a location that is one quarter of the way between two pixels of a reference picture, and so on. This disclosure may refer to an MV that indicates a location that is halfway between two pixels as an MV with half-pixel accuracy or as a half-pixel MV. This disclosure may refer to an MV that indicates a location that is a quarter of the way between two pixels as an MV with quarter-pixel accuracy or as a quarter-pixel MV. MVs that indicate sub-pixel locations (i.e., locations between two pixels) may be referred to as MVs with sub-pixel accuracy or simply as sub-pixel MVs. For instance, either or both horizontal and vertical components of a sub-pixel MV indicate sub-pixel locations of a reference picture.

When an MV of a PU indicates a sub-pixel location within a reference picture, a video coder (i.e., a video encoder or a video decoder) may interpolate the values of samples corresponding to the sub-pixel location from the actual values of samples in the reference picture. For example, if an MV indicates a location that is halfway between two pixels, the video coder may interpolate a value of a sample from the two pixels and/or other pixels. The video coder may use the interpolated values in the predictive sample blocks for the PU.

The use of sub-pixel MVs may increase coding efficiency (i.e., reduce the bit rate) of the bitstream by enabling the video encoder to generate predictive sample blocks for PUs that are closer to the original sample blocks for the PUs. However, in order to interpolate the value of a sample from neighboring samples, the video coder may need to transfer the values of each of the neighboring samples from memory. Transferring the values of samples from memory may be computationally intensive. This may be especially problematic for the video encoder because in either merge mode or advanced motion vector prediction (AMVP) mode, the video encoder may need to interpolate samples associated with sub-pixel MVs indicated by each MV candidate in a merge or AMVP candidate list in order to select an MV candidate from the merge or AMVP candidate list.

Thus, to support an acceptable or desired coding rate, the use of sub-pixel MVs may require an increase in the rate at which data is transferred from memory (i.e., the memory bandwidth) due to additional pixels required for interpolation. In some instances, it may not be possible or economical to increase the memory bandwidth. In this context, memory bandwidth reduction refers to the reduction in the amount of data that needs to be transferred from memory. Accordingly, rather than increase the memory bandwidth, it may be desirable in some instances to limit the amount of data transferred from memory.

One method for reducing the amount of data transferred from memory is to reduce the number of samples fetched from memory for interpolation. This reduction may be implemented by rounding the horizontal and/or vertical components of sub-pixel MVs to integer-pixel accuracy. In some examples, this rounding can be applied when interpolating luma samples and when interpolating chroma samples. In other examples, this rounding can be applied when interpolating either luma samples or when interpolating chroma samples. For instance, sub-pixel MVs can be rounded to integer-pixel accuracy for chroma samples, but the video coder may use the sub-pixel MVs for interpolating luma samples.

In accordance with the techniques of this disclosure, memory bandwidth reduction may be achieved by rounding either or both the horizontal or the vertical components of MVs to integer-pixel accuracy for particular CU and PU sizes. For example, a video coder may round either or both components of MVs for 4×8, 8×4, or smaller PUs to integer pixel accuracy. In this example, the video coder does not round components of MVs for larger PU sizes to integer-pixel accuracy.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. In other examples, video encoder 20 and video decoder 30 may operate according to other video compression standards, including the High Efficiency Video Coding (HEVC) standard presently under development. A draft of the upcoming HEVC standard, referred to as "HEVC Working Draft 6," is described in Bross et al., "High Efficiency Video Coding (HEVC) text specification draft 6," Joint Collaborative Team on Video Coding (JCT-VC) of ITU-T SG16 WP3 and ISO/IEC JTC1/SC29/WG11, 7th Meeting: Geneva, Switzerland, November, 2011, which, as of Apr. 4, 2013, is downloadable from http://phenix.int-evey.fr/jct/doc_end_user/documents/8_San %20Jose/wg11/JCTVC-H1003-v22.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11 th Meeting: Shanghai, China, October, 2012, which, as of Apr. 4, 2013, is downloadable from http://phenix.int-evry.fr/jct/doc_end_user/documents/11_Shanghai/wg11/JCTVC-K1003-v8.zip, the entire content of which is incorporated herein by reference. The techniques of this disclosure, however, are not limited to any particular coding standard or technique.

FIG. 1 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures.

A picture may include three sample arrays, denoted $S_L$, $S_{Cb}$, and $S_{Cr}$. $S_L$ is a two-dimensional array (i.e., a block) of luma samples. Luma samples may also be referred to herein as "Y" samples. $S_{Cb}$ is a two-dimensional array of Cb chrominance samples. $S_{Cr}$ is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., $S_{Cb}$ and $S_{Cr}$). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses uni-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some cases, video encoder 20 may signal the motion information of a PU using merge mode or advanced MV prediction (AMVP) mode. The motion information of a PU may include motion vector(s) of the PU and reference index (s) of the PU. When video encoder 20 signals the motion information of a current PU using merge mode, video encoder 20 generates a merge candidate list. The merge candidate list includes a set of candidates. The candidates may indicate the motion information of PUs that spatially or temporally neighbor the current PU. Video encoder 20 may then select a candidate from the candidate list and may use the motion information indicated by the selected candidate as the motion information of the current PU. Furthermore, in merge mode, video encoder 20 may signal the position in the candidate list of the selected candidate. Video decoder 30 may generate the same candidate list and may determine, based on the indication of the position of the selected candidate, the selected candidate. Video decoder 30 may then use the motion information of the selected candidate to generate predictive sample blocks for the current PU. In other words, video decoder 30 may generate, based at least in part on reference picture samples indicated by a selected MV candidate in the merge candidate list, the predictive sample block for the current PU.

AMVP mode is similar to merge mode in that video encoder 20 generates a candidate list and selects a candidate from the list of candidates. However, when video encoder 20 signals the motion information of a current PU using AMVP mode, video encoder 20 may signal a motion vector difference (MVD) for the current PU and a reference index in addition to signaling a position of the selected candidate in the candidate list. An MVD for the current PU may indicate a difference between an MV of the current PU and an MV of the selected MV candidate. In uni-prediction, video encoder 20 may signal one MVD and one reference indexes for the current PU. In bi-prediction, video encoder 20 may signal two MVDs and two reference indexes for the current PU.

Furthermore, when the motion information of a current PU is signaled using AMVP mode, video decoder 30 may generate the same candidate list and may determine, based on the indication of the position of the selected candidate, the selected candidate. Video decoder 30 may recover an MV of the current PU by adding a MVD to the MV of the selected candidate. Video decoder 30 may then use the recovered MV or MVs of the current PU to generate predictive sample blocks for the current PU.

As indicated above, MVs may have integer-pixel accuracy or sub-pixel accuracy. The use of MVs with sub-pixel accuracy may increase coding efficiency (i.e., reduce the bit rate) of the bitstream. However, the use of MVs with sub-pixel accuracy may increase the amount of bandwidth required to transfer data from memory. That is, in order to interpolate the value of a sample from neighboring samples, the video coder may need to transfer the values of each of the neighboring samples from memory. Furthermore, because a video encoder may compare rate/distortion values for different MV candidates in a merge or AMVP candidate list in order to select a MV candidate, video encoder 20 may fetch data needed to interpolate samples for sub-pixel MVs indicated by the MV candidates in the merge or AMVP candidate list, further increasing the amount of transferred data. Transferring data from memory may be a comparatively slow operation. Accordingly, it may be desirable to limit the amount of data transferred from memory.

In accordance with the techniques of this disclosure, reduction in the amount of data that needs to be transferred from memory may be achieved by a video coder (e.g., video encoder 20 or video decoder 30) rounding sub-pixel MVs to integer-pixel accuracy for particular CU and PU sizes. In this disclosure, rounding an MV may refer to rounding either or both the horizontal or vertical component of the MV. Moreover, in this disclosure, the size of a CU may refer to the size of a luma block of the CU and the size of a PU may refer to the size of a luma block of the PU. In some examples, where the video coder may round sub-pixel MVs for 4×8, 8×4, or smaller PUs to integer-pixel accuracy. In this example, the video coder does not round MVs for PU having larger sizes to integer-pixel accuracy. For instance, for PUs with sizes less than 4×8 and 8×4, this rounding may be applied, but for larger PUs, there is no rounding. In other examples, the video coder may round sub-pixel MVs for PUs of size 8×8.

Furthermore, in some examples, the size threshold at which the video coder rounds sub-pixel MVs may be set according to bandwidth reduction needs. In other words, the size threshold may be set based on the needed reduction in the amount of data to be transferred from memory. In some examples, a video coder may set this size threshold adaptively. In other examples, the size threshold may be preconfigured.

Thus, video encoder 20 may, in response to determining that a PU has a particular size, round a MV. Rounding the MV may comprise rounding at least one of a horizontal component or a vertical component of an MV from sub-pixel accuracy to integer-pixel accuracy. In some examples, video encoder 20 may round the MV as part of a process of generating a merge candidate list or an AMVP candidate list. In other examples, video encoder 20 may round the MV during motion compensation. Furthermore, video encoder 20 may generate, based at least in part on the rounded MV, a predictive sample block for the PU. For example, if the MV was rounded during generation of a merge candidate list and the MV is the selected MV candidate, video encoder 20 may generate, based at least in part on reference picture samples indicated by the rounded MV, the predictive sample block for the PU. In another example, if the MV was rounded during generation of an AMVP candidate list and the MV is the selected MV candidate, video encoder 20 may determine, based on the MV and a MVD, a MV. Furthermore, in this example, video encoder 20 may generate, based at least in part on reference samples indicated by the determined MV, the predictive sample block for the PU. In examples where video encoder 20 rounds the MV during motion compensation, video encoder 20 may generate, based on reference samples indicated by the rounded MV, the predictive sample block for the PU. Video encoder 20 may generate, based in part on the predictive sample block for the PU, a residual sample block for the PU. Video encoder 20 may signal, in a bitstream, the residual sample block for the PU. Video encoder 20 may signal the residual sample block for the PU by transforming residual samples of the sample block into transform coefficients, quantizing the transform coefficients, entropy encoding syntax elements representing the transform coefficients, and outputting the entropy-encoded syntax elements in the bitstream.

In some examples, video decoder 30 may, in response to determining that a PU has a particular size, round a MV. Rounding the MV may comprise rounding at least one of a horizontal component or a vertical component of the MV from sub-pixel accuracy to integer-pixel accuracy. In some examples, video decoder 30 may round the MV as part of a process of generating a merge candidate list or an AMVP candidate list. In other examples, video decoder 30 may round the MV during motion compensation, Furthermore, video decoder 30 may generate, based at least in part on the rounded MV, a predictive sample block for the PU. For example, if the MV was rounded during generation of a merge candidate list and the MV is the selected MV candidate, video decoder 30 may generate, based at least in part on reference picture samples indicated by the rounded MV, the predictive sample block for the PU. In another example, if the MV was rounded during generation of an AMVP candidate list and the MV is the selected MV candidate, video decoder 30 may determine, based on the MV and a MVD, a MV. Furthermore, in this example, video decoder 30 may generate, based at least in part on reference samples indicated by the determined MV, the predictive sample block for the PU. In examples where video decoder 30 rounds the MV during motion compensation, video decoder 30 may generate, based on reference samples indicated by the rounded MV, the predictive sample block for the PU. Video decoder 30 may generate, based at least in part on the predictive sample block for the PU, a reconstructed sample block for the PU.

In some examples, a video coder, such as video encoder 20 or video decoder 30, may determine, based at least in part on the inter-prediction direction of a PU, whether to round a MV (e.g., round either or both components of an MV) of the PU to integer-pixel accuracy. In other words, MV rounding can be performed according to the inter direction mode. For example, if a PU is uni-predicted, the video coder does not round components of MVs of the PU to integer pixel accuracy. In this example, if the PU is bi-predicted, the video coder rounds either or both the components of either or both MVs of the PU to integer-pixel accuracy. For instance, if the PU is bi-predicted, the video coder may round either or both components of one MV of the PU and round neither component of the other MV of the PU. In this way, rounding can be applied to uni- and bi-prediction MVs, or to bi-prediction MVs only. In another example, if a PU is uni-predicted, the video coder rounds components of MVs of the PU to integer pixel accuracy. In this example, if the PU is bi-predicted, the video coder does not round either or both the components of either or both MVs of the PU to integer-pixel accuracy. Thus, the video coder may determine, based at least in part on the current PU having a particular size and an inter direction mode (i.e., uni-predicted or bi-predicted) of the current PU, whether to round at least one of the horizontal component or the vertical component of the motion vector from sub-pixel accuracy to integer-pixel accuracy.

As described above, video encoder 20 may use merge mode or AMVP mode to signal the motion information of a PU. In both merge mode and AMVP mode, video encoder 20 and video decoder 30 may generate lists of MV candidates. When a video coder (e.g., video encoder 20 or video decoder 30) generates a list of MV candidates, the video coder may perform a pruning process that removes duplicate MV candidates from the list of MV candidates. In merge mode, a first MV candidate may be a duplicate of a second MV candidate if the first MV candidate indicates the same MV and the same reference index as the second MV candidate. In other words, in merge mode, duplicate MV candidates may indicate the same MV and indicate the same reference index. In AMVP mode, a first MV candidate may be a duplicate of a second MV candidate if the first MV candidate indicates the same MV as the second MV candidate. In other words, in AMVP mode, duplicate MV candidates indicate the same MV.

In some examples, the video coder may round either or both components of MVs of MV candidates in a MV candidate list before performing the pruning process. Rounding components of MVs before performing the pruning process may reduce duplicate MV candidates in the MV candidate list, at the cost of increased complexity. In other words, if MV rounding is done before pruning, additional redundancy of having the same rounded MV candidate may be avoided. However, MV rounding prior to pruning may entail modifications to the pruning process of merge MV candidate list generation and/or AMVP MV candidate list generation. In either case, because the MVs indicated by the MV candidates are rounded to integer-pixel accuracy, video encoder 20 does not need to transfer sample values needed to interpolate the samples corresponding to locations indicated by the MVs. This may reduce the amount of data fetched from memory when video encoder 20 is selecting an MV candidate from a merge candidate list or an AMVP candidate list.

In other examples, the video coder may round components of MVs of MV candidates in the MV candidate list after performing the pruning process. MV rounding after pruning may enable the MV candidate list generation process to remain unchanged relative to HEVC Working Draft 6.

Furthermore, when a video coder generates a MV candidate list for signaling the motion information of a current PU using merge mode, the video coder may include artificial MV candidates in the MV candidate list. The artificial MV candidates do not indicate the motion information of any PUs that spatially or temporally neighbor the current PU. For example, the video coder may include one or more combined-bi MV candidates in the MV candidate list. In this example, a combined-bi MV candidate is composed from any two spatial or temporal MV candidates already in a merge candidate list by combining a MV from RefPicListL0 of the first MV candidate and a MV from RefPicListL1 of the second MV candidate, making a bi-directional MV candidate. In another example, the video coder may include one or more zero MV candidates in the MV candidate list. A zero MV candidate may specify an MV that has horizontal and vertical components equal to 0.

In accordance with one or more techniques of this disclosure, the video coder may generate, based on a single MV with sub-pixel accuracy, multiple MVs with integer-pixel accuracy. The video coder may generate the MVs with integer pixel accuracy by rounding either or both components of the MV with sub-pixel accuracy in different directions. In other words, the video coder may generate a first integer-pixel MV by rounding either or both the horizontal and vertical components of a sub-pixel MV to a next-higher integer value and may generate a second MV by rounding either or both the horizontal and vertical components of the same sub-pixel MV to a next-lower integer value. The MVs generated by rounding components of the MV in different directions may replace one or more of the artificial MV candidates in the MV candidate list. As a result, the video coder may skip the process of adding the artificial MV candidates to the MV candidate list. That is, when MV rounding is applied, adding artificial MV candidates can be skipped during merge MV candidate list construction.

Thus, the video coder may generate a first rounded MV by rounding, in a first direction, one or more components of an MV to integer-pixel accuracy and may generate a second rounded MV by rounding, in a second direction, one or more components of the MV to integer-pixel accuracy. In other words, the video coder may generate the first rounded MV by rounding at least one component of the MV to a next-higher integer value and may generate a second rounded MV by rounding the at least one component of the MV to a next-lower integer value. In addition, the video coder may generate a merge or AMVP candidate list for the PU. The candidate list may include a first and a second MV candidate that specify the first and second rounded MVs, respectively. Thus, in this example, a non-integer pixel MV may be rounded to different neighboring integer pixel locations, which may result in multiple additional candidates that may be better in serving as a MV predictor than the artificial MV candidates. In this example, a video encoder may signal, in the bitstream, an index of a selected MV candidate in the candidate list. Otherwise, a video decoder may determine, based at least in part on a MVD and a motion vector indicated by a selected MV candidate in the AMVP candidate list, the motion vector for the current PU.

When the motion information for a current PU is signaled in AMVP mode, video encoder 20 may signal a MVD as well as signaling a reference index and a position within a MV candidate list of a selected MV candidate. Video decoder 30 may determine an MV of the PU by adding the MVD to an MV specified by the selected MV candidate. To ensure that video decoder 30 generates an integer-pixel MV for the current PU, video encoder 20 and video decoder 30 may round to sub-pixel MVs of MV candidates in the MV candidate list. In addition, video encoder 20 and video decoder 30 may round either or both the horizontal (x) and vertical (y) components of the MVD to integer accuracy. Video encoder 20 may signal the rounded MVD in the bitstream. Because both the MVs of the MV candidates and the MVD have integer accuracy, the resulting MV for the current PU has integer accuracy (at least in one dimension).

Furthermore, in some examples, a video coder may determine, based at least in part on the block size of a current PU and a PU index of the current PU, whether to round at least one of a horizontal component and a vertical component of a MV of the current PU from sub-pixel accuracy to integer-pixel accuracy. Thus, MV and/or MV component rounding may be further adaptively controlled by PU index and/or PU size in a CU, so that MV rounding is only applied to some PUs in a CU. The PU index of a PU may indicate a position within a CU of the PU according to a coding order (e.g., a z-scan order). For example, a video coder may round a MV or MV component of only a first PU of a CU and not subsequent PUs of the CU. In other examples, the video coder may apply MV rounding to only a second PU of a CU and not the first PU of the CU. Furthermore, in some examples, the video coder may apply MV rounding to a predetermined subset of one or more of the PUs of the CU. In this way, a video coder may determine, based at least in part on the current PU having a particular size and a PU index of the current PU, whether to round at least one of the horizontal component or the vertical component of a motion vector from sub-pixel accuracy to integer-pixel accuracy.

PU-based adaptive rounding of MVs or MV components may be applied to asymmetric motion partitions (AMPs) of CUs as well as PUs of CUs. The sample blocks of AMPs of a CU may be asymmetrical partitions of coding blocks of the CU. For example, the size of the luma coding block of a CU may be 16×16. In this example, there may be four cases of AMPs with the respective sizes of 16×4 and 16×12, 16×12 and 16×4, 4×16 and 12×16, and 12×16 and 4×16. Each AMP may include or act as a single PU.

In some examples, the video coder may round MVs or MV components of PUs of relatively small AMPs, such as 16×4 or 4×16 AMPs. In such examples, the video coder does not round MVs or MV components of relatively large AMPs, such as AMPs of size 16×12 or 12×16. In other words, for the smallest PU, 16×4 or 4×16, rounding of MVs or MV components can be applied, but for the relatively larger partitions of 16×12 or 12×16, rounding of MVs or MV components is not applied. In this example, the video coder may check whether to round MVs or MV components of AMPs in the following way:

if (PU_width<8||PU_height<8){apply MV or MV components rounding}

In another example, the video coder may round only the vertical components of MVs for certain PUs. Furthermore, in other examples, the CU may have a size different than 16×16 and hence the sizes of AMPs may be different.

Because it may be more efficient to signal and store integer numbers than non-integer numbers, components of MVs may be signaled and stored as integer numbers. For instance, video encoder 20 may use integer-valued MVDs to signal MV components having both integer-pixel and sub-pixel accuracy. In some examples where quarter-pixel accuracy is supported, the integer that represents a MV component may be equal to 4 times the actual value of the MV component. Thus, the value 4 may indicate that an MV component actually has a value equal to 1. Hence, the values . . . −8, −4, 0, 4, 8, . . . may indicate values of inter-pixel MV components while the values −7, −6, −5, −3, −2, −1, 1, 2, 3, 5, 6, 7, . . . may indicate values of sub-pixel MV components. In such examples, rounding a MV component from sub-pixel accuracy to integer-pixel accuracy may involve replacing the integer value representing the sub-pixel MV component with an integer value representing an integer-pixel MV component. For example, a sub-pixel MV component may indicate a position that is ¾ of the way between two pixels. In this example, the value 3 may represent this sub-pixel MV component. Furthermore, in this example, when the sub-pixel MV component is rounded to integer-pixel accuracy, the value 4 may represent the resulting integer-pixel MV component.

Figure 2:
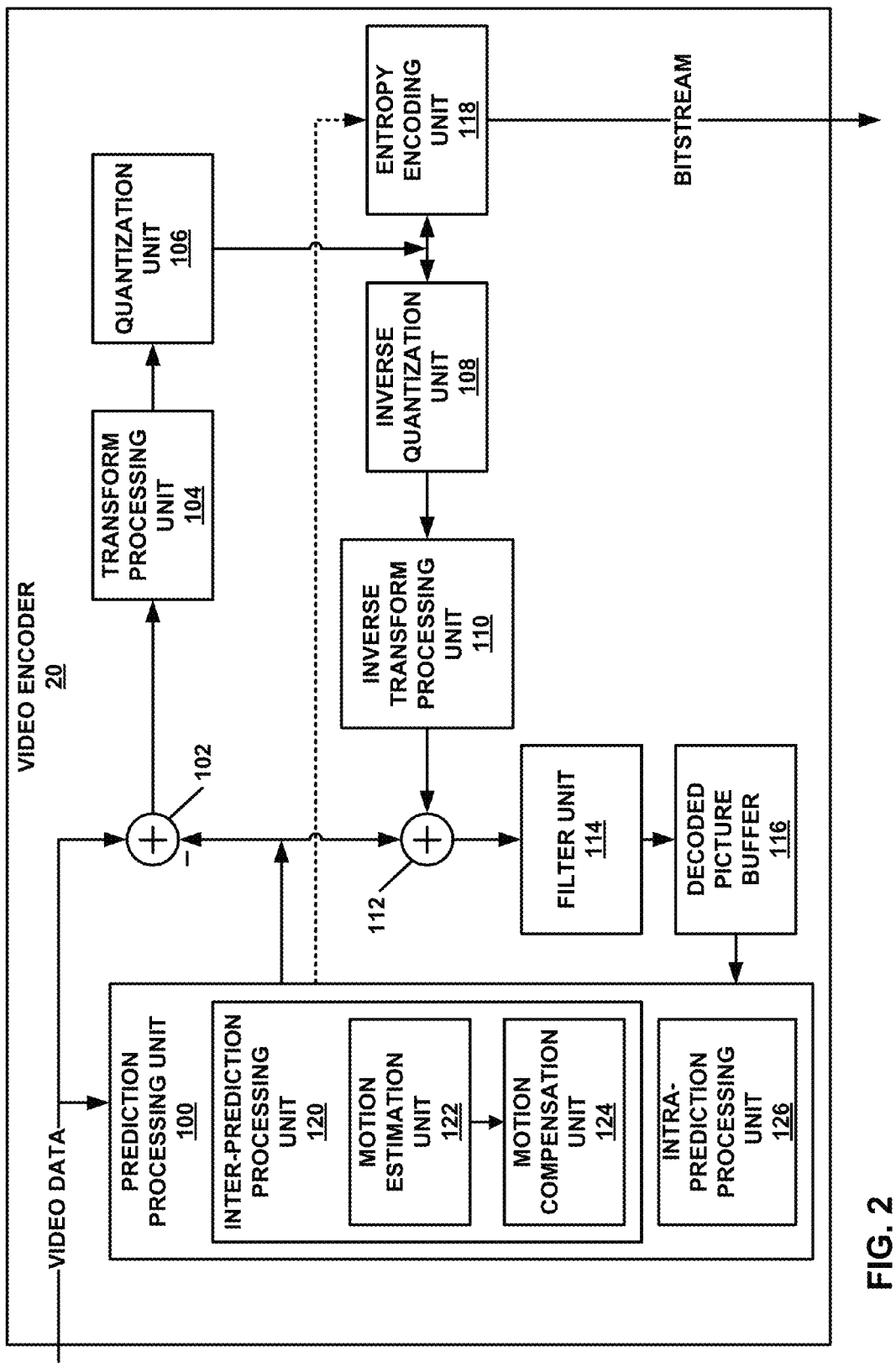
FIG. 2 is a block diagram illustrating an example video encoder that may implement the techniques of this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the sample blocks of the PU. Motion estimation unit 122 may generate a reference index that indicates a position in RefPicList0 of the reference picture containing the reference region for the PU. In addition, motion estimation unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation unit 122 may output the reference index and the MV as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes that indicate positions in RefPicList0 and RefPicList1 of the reference pictures that contain the reference regions. In addition, motion estimation unit 122 may generate MVs that indicate spatial displacements between the reference location associated with the reference regions and a sample block of the PU. The motion information of the PU may include the reference indexes and the MVs of the PU. Motion compensation unit 124 may generate the predictive sample blocks of the PU based at least in part on actual or interpolated samples at the reference region indicated by the motion vector of the PU.

In accordance with one or more techniques of this disclosure, inter-prediction processing unit 120 may round an MV of a current PU prior to motion compensation unit 124 using the MV of the current PU to generate predictive sample blocks for the current PU. In some examples, inter-prediction processing unit 120 may determine whether the current PU has a particular size and may determine whether an MV of the current PU has sub-pixel accuracy. In such examples, inter-prediction processing unit 120 may, in response to determining that the current PU has the particular size and that the MV of the current PU has sub-pixel accuracy, round at least one of a horizontal component or a vertical component of the MV from sub-pixel accuracy to integer-pixel accuracy. In other examples, motion compensation unit 124 may round MV components.

Inter-prediction processing unit 120 may use various rounding techniques to round an MV from sub-pixel accuracy to integer-pixel accuracy. That is, different approaches can be used for rounding purposes. For example, a luma MV is an MV that indicates a position within a luma array of a reference picture. In this example, inter-prediction processing unit 120 may round a luma MV by simple division by 4 or a right shift operation by 2 because luma MVs may have quarter pixel accuracy.

In some examples where inter-prediction processing unit 120 rounds a component of an MV by dividing the component by 4, inter-prediction processing unit 120 may add an additional offset to the component prior to dividing the component by 4. That is, where MV is the original value of a component of an MV, MV' is the rounded value of the component, inter-prediction processing unit 120 may calculate:

$$MV'=[(MV+\text{offset})/4]$$

Furthermore, a chroma MV may be an MV that indicates a position within a chroma (e.g., Cb or Cr) array of a reference picture. In many codecs, video encoders do not signal chroma MVs in bitstreams because video decoders may be able to calculate the chroma MVs from corresponding luma MVs. In examples where the 4:4:4 video format is used, the chroma arrays of pictures are not down-sampled relative to the luma arrays of pictures. Hence, in the 4:4:4 video format, a chroma MV for a PU may match the luma MV for the PU. In examples where the 4:2:0 video format is used, the horizontal component of a chroma MV of a PU may be equal to ½ the horizontal component of a luma MV of the PU and the vertical component of the chroma vector of the PU may be equal to ½ the vertical component of the luma MV of the PU. Similarly, in the 4:2:2 video format, the horizontal component of a chroma MV of a PU may be equal to ½ the horizontal component of a luma MV of the PU and the vertical component of the chroma MV of the PU may be equal to the vertical component of the luma MV of the PU.

If inter-prediction processing unit 120 rounds both luma and chroma MVs of a PU together, inter-prediction processing unit 120 may synchronize the rounding in order to avoid a phase shift between the luma and chroma components. For example, if the 4:2:0 sampling format is used, a chroma MV with half-pixel accuracy may correspond to a luma MV with integer-pixel accuracy. In this example, if inter-prediction processing unit 120 rounds the luma MV to integer-pixel accuracy, inter-prediction processing unit 120 does not simply round the chroma MV to integer-pixel accuracy along with the luma MV because this may cause a phase shift. When a phase shift occurs, the luma samples indicated by the luma MV do not correspond to the chroma samples indicated by the chroma MV. Rather, the chroma samples indicated by the chroma MV may be horizontally or vertically displaced from the luma samples indicated by the luma MV. Hence, in this example, if inter-prediction processing unit 120 rounds both luma and chroma MVs, inter-prediction processing unit 120 may divide the luma MV by 8 and may divide the chroma MV by 4. That is, inter-prediction processing unit 120 may shift the luma MV to the second nearest integer point instead of the nearest integer position, while inter-prediction processing unit 120 may shift the chroma MV to the nearest integer position.

In another example, inter-prediction processing unit 120 may use the following operation to perform rounding. In this example, inter-prediction processing unit 120 may round a component of an MV by dividing the component by 4 and using the following formula:

$$MV'=\text{Sign}(MV)*((abs(MV)+1)>>2)$$

In the formula above, MV' denotes a rounded MV component. Sign ( ) is a function that returns 1 if the MV component is greater than or equal to 0 and returns −1 if the MV component is less than 0. abs ( ) s is a function that returns the absolute value of the MV component. >> denotes the right shift operation. A similar rounding technique is used during MV scaling in HEVC Working Draft 6. Consequently, the same physical rounding module may be used for MV scaling and for MV rounding for memory bandwidth reduction. This may reduce the complexity of hardware implementations of HEVC.

In some examples, inter-prediction processing unit 120 does not generate and then round sub-pixel MVs. Rather, in some examples, inter-prediction processing unit 120 is constrained from generating sub-pixel MVs for PUs having particular sizes. In one example, inter-prediction processing unit 120 does not generate sub-pixel MVs for PUs with luma blocks with sizes smaller than 8×8. Such a restriction may be imposed as a bitstream constraint. Thus, for small blocks, such as blocks 8×8 or smaller, non-integer MVs or non-integer MV components for bi-predicted PUs are not present in a bitstream. This may apply to MVs for MV prediction or MVs for motion compensation. Restriction of non-integer MVs or components thereof may be defined in a profile or level description.

Rounding is described above, and elsewhere in this disclosure as being performed at video encoder 20 by inter-prediction processing unit 120. However, in other examples, rounding may be performed by other components of video encoder 20, such as motion estimation unit 122, motion compensation unit 124, and so on. Thus, in some examples, rounding may occur during candidate list construction. In other examples, rounding may occur prior to motion compensation. In other examples, rounding may occur during motion compensation.

Continued reference is now made to the example of FIG. 2. Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
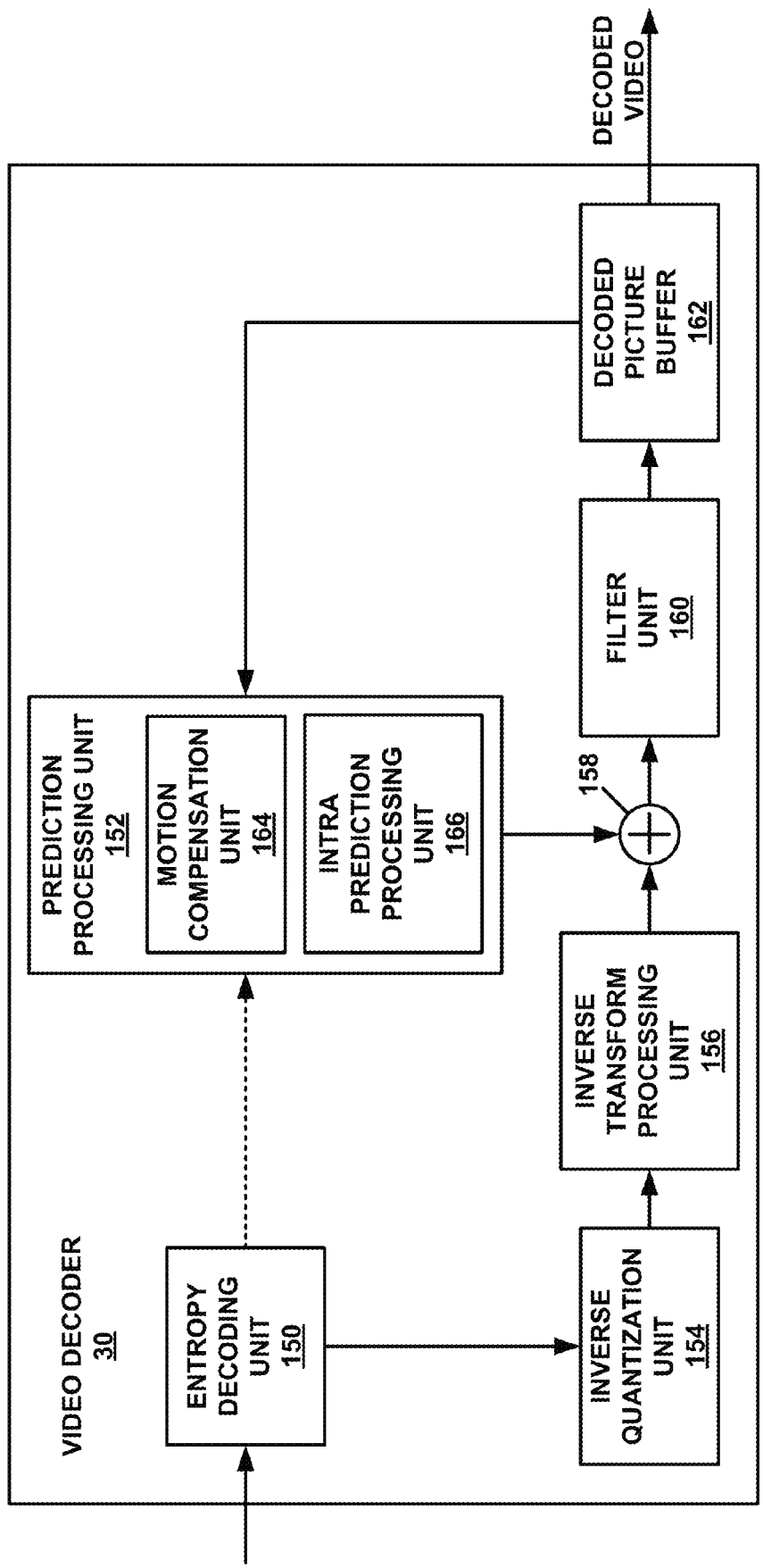
FIG. 3 is a block diagram illustrating an example video decoder that may implement the techniques of this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

As indicated above, video encoder 20 may signal the motion information of a PU using merge mode or AMVP mode. When video encoder 20 signals the motion information of a current PU using AMVP mode, entropy decoding unit 150 may decode, from the bitstream, a reference index, a MVD for the current PU, and a candidate index. Furthermore, motion compensation unit 164 may generate an AMVP candidate list for the current PU. The AMVP candidate list includes one or more MV predictor candidates. Each of the MV predictor candidates specifies a MV of a PU that spatially or temporally neighbors the current PU. Motion compensation unit 164 may determine, based at least in part on the candidate index, a selected MV predictor candidate in the AMVP candidate list. Motion compensation unit 164 may then determine the MV of the current PU by adding the MVD to the MV specified by the selected MV predictor candidate. In other words, for AMVP, an MV is calculated as MV=MVP+MVD, wherein the index of the motion vector predictor (MVP) is signaled and the MVP is one of the MV candidates (for example, spatial or temporal) from the AMVP list, and the MVD is signaled to the decoder side.

If the current PU is bi-predicted, entropy decoding unit 150 may decode an additional reference index, MVD, and candidate index from the bitstream. Motion compensation unit 164 may repeat the process described above using the additional reference index, MD, and candidate index to derive a second MV for the current PU. In this way, motion compensation unit 164 may derive a MV for RefPicList0 (i.e., a RefPicList0 MV) and a MV for RefPicList1 (i.e., a RefPicList1 MV).

In HEVC Working Draft 6, the MVD is not signaled for RefPicList1 if a low delay condition is true. The low delay condition may be true if a Picture Order Count (POC) value of any reference frame is less a POC value of a current picture. If the low delay condition is true, video encoder 20 and video decoder 30 may assume (i.e., automatically determine) that the MVD for RefPicList1 is equal to zero. Regardless of whether the low delay condition is true, video encoder 20 signals a MVD for RefPicList0 if the motion information of the current PU is signaled using AMVP mode.

If inter-prediction processing unit 120 determines that a MV of a PU is to have integer-pixel accuracy, inter-prediction processing unit 120 may select an MVP that has sub-pixel accuracy. However, in this case, inter-prediction processing unit 120 may generate and signal a MVD that, when added to the selected MVP, results in an integer-pixel MV. For example, if the selected MVP has half-pixel accuracy, inter-prediction processing unit 120 may generate and signal a MVD with half-pixel accuracy. In this way, to guarantee an MV to be an integer-pixel MV, the MVP does not need to have integer-pixel accuracy if the MVD is also signaled to video decoder 30 because a sub-pixel MVP may be compensated by the MVD and the sum of the MVP and the MVD can still have integer-pixel accuracy.

In some examples, not all MVD values are signaled in a bitstream. For example, when motion information of a PU is signaled using AMVP mode and a particular syntax element (e.g., mvd_l1_zero_flag) has a particular value (e.g., 1), a RefPicList1 MVD for the PU is not parsed from (or signaled in) the bitstream. In this example, if the particular syntax element has a different value (e.g., 0), a RefPicList1MVD for the PU is signaled in and parsed from the bitstream. The particular syntax element (e.g., mvd_l1_zero_flag) may be enabled when a low delay condition is true. Hence, in some examples, when the low delay condition is true, inter-prediction processing unit 120 does not signal a RefPicList1 MVD for a current PU. A RefPicList1 MVD is an MVD that indicates a difference between an MVP in an AMVP candidate list generated for determining a RefPicList1 MV of a PU (i.e., a RefPicList1 MVP) and a RefPicList1 MV of the PU (i.e., an MV indicating a location within a reference picture in RefPicList1). When inter-prediction processing unit 120 does not signal a RefPicList1 MVD for the current PU and when inter-prediction processing unit 120 determines that the RefPicList1 MV of the current PU is to have integer-pixel accuracy, inter-prediction processing unit 120 cannot select a sub-pixel RefPicList1 MVP and a sub-pixel RefPicList1 MVD that, when added together, result in an integer-pixel RefPicList1 MV. Thus, in the case of no signaling of a MVD for the RefPicList1 MVD, such compensation may be impossible and, as a result, the RefPicList1 MVP may have to be rounded to integer-pixel accuracy. In this way, when RefPicList1 MVD is not signaled in a bitstream, when the RefPicList1 MV of the current PU is to have integer-pixel accuracy, and when the selected RefPicList1 MVP has sub-pixel accuracy, inter-prediction processing unit 120 may round the RefPicList1 MVP to integer-pixel accuracy. Moreover, when RefPicList1 MVD is not signaled in a bitstream, when the RefPicList1 MV of the current PU is to have integer-pixel accuracy, and when the selected RefPicList1 MVP has sub-pixel accuracy, video decoder 30 may round the RefPicList1 MVP to integer-pixel accuracy and may use the resulting integer-pixel MVP to determine a RefPicList1 reference block.

In some examples, inter-prediction processing unit 120 may apply rounding to MVs from both reference picture lists RefPicList0 and RefPicList1, providing more flexibility for the MVD. Actual magnitude of MVD can be reduced, since several fractional values can be rounded to the same integer value, and the video encoder may choose the smallest one. In this case, an MV can be given by the formula MV=[MVP+MVD], where square brackets [ ] represent a rounding function. For example, inter-prediction processing unit 120 may add the same MVP to two or more different sub-pixel MVDs and may round the resulting MVs to obtain the same MV. For instance, in this example, an MVP may be equal to 3, a first MVD may be equal to 2, and a second MVD may be equal to 0. In this instance, inter-prediction processing unit 120 may round both the MVs that result from adding the MVP to the first and second MVD to 4 (i.e., [3+2]=[5]=4 and [3+0]=[3]=4, where square brackets [ ] represent a rounding function). In this instance, inter-prediction processing unit 120 may signal the second MVD because fewer bits may be required to signal the second MVD than the first MVD.

As mentioned above, inter-prediction processing unit 120 may round both components (MVx and MVy) of a MV. In other examples, inter-prediction processing unit 120 may round only one component (e.g., MVx or MVy) of an MV. In examples where inter-prediction processing unit 120 rounds only the horizontal component of an MV and the motion information of a current PU is signaled using AMVP mode, the rounding operation may be expressed as: MVx=[MVPx+MVDx], where the square brackets [ ] indicate rounding. Similarly, in examples where inter-prediction processing unit 120 rounds only the vertical component of a MV and the motion information of a current PU is signaled using AMVP mode, the rounding operation may be expressed as: MVy=[MVPy+MVDy], where the square brackets [ ] indicate rounding.

In other examples, inter-prediction processing unit 120 may force either or both components of an MVD to have integer-pixel accuracy. In such examples, inter-prediction processing unit 120 may signal rounded versions of either or both components of the MVD. For instance, inter-prediction processing unit 120 may signal MVD/4, MVDx/4, or MVDy/4, instead of the MVD. Rounding either or both components of the MVD may reduce signaling overhead because MVD binarization length may be shorter. The signaling overhead may be the number of bits in the bitstream used to signal the MVD. The MVD binarization length may be the number of bits in a binarized version of the MVD for entropy (e.g., CABAC) coding.

In at least some examples where inter-prediction processing unit 120 signals a rounded version of a MVD, an integer-pixel MVD can be defined as:

$$MV=[MVP]+(MVD<<2)$$

In such examples, video decoder 30 may reconstruct the MV as:

$$MV=[MVP+(MVD<<2)]$$

Alternatively, video decoder 30 may reconstruct the MV as:

$$MV=[MVP]+(MVD<<2)$$

In this alternative, video decoder 30 rounds only the MVP. Either of these techniques for reconstructing the MV may provide the same results if the MVD has integer-pixel accuracy.

In examples where inter-prediction processing unit 120 forces the horizontal component of a MVD to have integer-pixel accuracy, the horizontal component of the MVD may be calculated as:

$$MVDx=[MVx-[MVPx]]>>2$$

and video decoder 30 may reconstruct MVx as:

$$MVx=[MVPx+(MVDx<<2)]$$

Alternatively, video decoder 30 may reconstruct MVx as:

$$MVx=[MVPx]+(MVDx<<2)$$

Similarly, in examples where inter-prediction processing unit 120 forces the vertical component of a MVD to have integer-pixel accuracy, the vertical component of the MVD may be calculated as:

$$MVDy=[MVy-[MVPy]]>>2$$

and video decoder 30 may reconstruct MVy as:

$$MVy=[MVPy+(MVDy<<2)]$$

Alternatively, video decoder 30 may reconstruct MVy as:

$$MVy=[MVPy]+(MVDy<<2)$$

In some examples, rounding of MVs, MVPs, or MVDs may be synchronized with the rounding of merge MV candidates in terms of rounding both components of MV, or one component (MVx or MVy) of the MV, or the MV from one of the two reference picture lists, or which block sizes are to be rounded. In other words, MVs, MVPs, or MVDs may be rounded in the same way as MVs of merge MV candidates are rounded. The rounding methods described elsewhere in this disclosure may be used to round the MVs, MVPs, or MVDs when motion information is signaled in merge mode or AMVP mode.

In some examples, inter-prediction processing unit 120 of video encoder 20 does not round MVs. Rather, rounding of MVs may occur during motion compensation by motion compensation units 124, 164. When rounding of MVs occurs at the motion compensation stage, the MV signaled or derived for a PU may have sub-pixel accuracy, regardless of PU size. For instance, video encoder 20 may signal, in the bitstream, a sub-pixel MVD of a current PU. However, during motion compensation, motion compensation units 124, 164 may round a sub-pixel MV of a PU to integer-pixel accuracy and may use the resulting integer-pixel MV to determine a location of a reference block of the PU. Motion compensation units 124, 164 may round MVs or MV components in at least some of the ways described in this disclosure that inter-prediction processing unit 120 rounds MVs or MV components.

Unlike examples where inter-prediction processing unit 120 rounds sub-pixel MVs to integer-pixel accuracy, motion compensation units 124, 164 may use the unrounded sub-pixel MVs for predicting succeeding blocks' MVs. The succeeding blocks may be PUs that follow a current PU in coding order. For example, inter-prediction processing unit 120 may generate a sub-pixel MV for a particular PU and motion compensation units 124, 164 may round the sub-pixel MV to an integer-pixel MV during motion compensation. In this example, when motion compensation units 124, 164 generate merge candidate lists or AMVP candidate lists for a succeeding PU, the merge candidate lists or AMVP candidate lists may include the original sub-pixel MV for the particular PU and not the rounded integer-pixel MV. In contrast, when the sub-pixel MV of the particular PU is rounded during motion estimation, the merge candidate lists or AMVP candidate lists for the succeeding PU may include the rounded integer-pixel MV for the succeeding PU, not the sub-pixel MV.

In examples where motion compensation units 124, 164 round MVs, motion compensation units 124, 164 may determine, based at least in part on a size of a PU, whether to round a MV of the PU. Furthermore, in some examples, motion compensation units 124, 164 may determine, based at least in part on whether a PU is uni-predicted or bi-predicted, whether to round a MV of the PU. For example, motion compensation units 124, 164 may round only MVs (or vertical components of MVs) of bi-predicted PUs of size 8×4 or 4×8 to inter-pixel precision. In other words, only for bi-directional blocks with size 8×4 or 4×8, MV or MVy components may be rounded to integer-pixel precision at the motion compensation stage.

Furthermore, in examples where motion compensation units 124, 164 round MVs, sub-pixel MVs may be allowed regardless of the sizes of PUs. Hence, in such examples, video encoder 20 may signal MVDs in the way described in HEVC Working Draft 6. In other words, since sub-pixel MVs are allowed regardless of block size, there may be no change needed in MVD signaling.

In some examples where motion compensation units 124, 164 round MVs, motion compensation units 124, 164 may round only luma MVs or MV components. In other examples, motion compensation units 124, 164 may round only chroma MVs or MV components. In still other examples, motion compensation units 124, 164 may round both luma and chroma MVs or MV components.

In some examples, video encoder 20 may signal, in the bitstream, a syntax element (e.g., a flag) that indicates MVs are to be rounded during motion compensation. Thus, motion compensation unit 164 may determine, based at least in part on the syntax element, whether to round a sub-pixel MV of a PU to integer-pixel accuracy. For instance, the restriction of MV precision through MV rounding on bi-predicted blocks, either in merge list construction or MV/MVP for AMVP mode, may be switched on or off through a flag. Video encoder 20 may signal the syntax element at various levels of the bitstream. For example, video encoder 20 may signal the syntax element in a header at a particular level, such as a picture level or a slice level, or in an adaptive parameter set. In other examples, video encoder 20 may signal the syntax element at a lower level, such as a CTU (LCU) level, a CU level, or a PU level, for a finer signaling structure.

Continuing reference is now made to FIG. 3. Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 4:
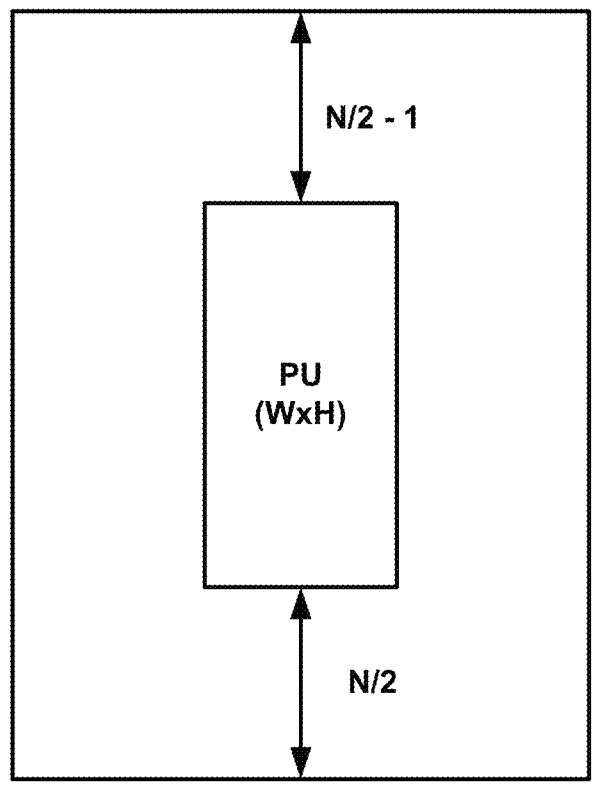
FIG. 4 is a conceptual diagram illustrating a block size fetched for 2-dimensional (2D) interpolation.

FIG. 4 is a conceptual diagram illustrating a block size fetched for 2-dimensional (2D) interpolation. A value at a given position may be calculated using 1-dimensional interpolation based on samples in a 1-dimensional horizontal, vertical, or diagonal line through the position. A value of a given position may be calculated using 2-dimensional interpolation based on samples arrayed in a 2-dimensional space that includes the given position. For instance, when the value of a given position is calculated using 2-dimensional interpolation, the value may be calculated based on samples arrayed in an X-shaped pattern with the given position at the center.

In some examples, inter-prediction processing unit 120 may determine, based on a worst case consideration, whether to round one or more components of an MV. In other words, an MV to be rounded can be defined by a worst case consideration (i.e., the worst case scenario). In this disclosure, the "worst case scenario" may refer to a scenario in which the number of samples fetched from memory is greatest. For example, in HEVC Working Draft 6 if 4×4 blocks are disabled, the worst case in terms of memory bandwidth requirements may be 4×8 and 8×4 bi-predicted PUs with 2D interpolation (i.e., MVx and MVy both have sub-pixel accuracy, where MVx is the horizontal component of an MV and MVy is the vertical component of the MV). In this example, if the 4:2:0 video format is used, if an 8-tap interpolation filter is used for luma sample and if a 4-tap interpolation filter is used for chroma samples, a motion compensation unit (such as motion compensation unit 124 or motion compensation unit 164) may fetch from memory two blocks of size 15×11 for a 8×4 luma block of a PU and four blocks of size 7×5 for 4×2 chroma blocks of the PU. In this example, the 4×2 chroma blocks correspond to the 8×4 luma block because in the 4:2:0 video format, chroma blocks are down-sampled in both the horizontal and vertical directions.

As a general rule, the block size fetched by the motion compensation unit for interpolation is (N−1+W)*(N−1+H), where N is the filter length, W is the width of a block, and H is the height of the block. The filter length (i.e., the length of the interpolation filter) indicates how many integer-position samples along a particular line are used to calculate an interpolated value. As shown in the example of FIG. 4, height of the fetched block may extend beyond the height of the sample block of the PU by approximately the length of the interpolation filter. Thus, the number of fetched samples above the sample block of the PU may be equal to N/2−1 and the number of fetched samples below the sample block of the PU may be equal to N/2.

In other examples, the memory bandwidth requirements may be such that inter-prediction processing unit 120 rounds MV components for PUs having luma prediction blocks smaller than 8×8. That is, assuming that the memory bandwidth requirements are reduced for 4×8 and 8×4 blocks so that 4×8 and 8×4 blocks are no longer a worst case scenario in terms of numbers of samples to be fetched, the next worst case scenario is 8×8 bi-directionally predicted PUs with 2D interpolation. In some such examples, a motion compensation unit (e.g., motion compensation units 124, 164) may fetch two luma reference blocks of size 15×15 and four chroma reference blocks of size 7×7. In this example, the motion compensation unit fetches two luma reference blocks and four chroma reference blocks because in bi-directional prediction, the luma predictive block of a PU and the chroma prediction blocks of the PU are each determined from two reference blocks. In examples where the worst case scenario in terms of memory bandwidth requirements is 16×8 bi-directionally predicted PUs with 2D interpolation, a motion compensation unit may fetch two luma reference blocks of size 23×15 and four chroma (e.g., U and V) reference blocks of size 11×7.

Considering improving from one worst case scenario to the next worst case scenario, methods restricting the number of fetched pixels to be smaller than the next worst case may be suitable. That is, when the PUs of a CU have a configuration (e.g., 8×4 bi-predicted PUs) associated with the worst case scenario, a video coder, such as video encoder 20 or video decoder 30, may round sub-pixel MVs in such a way that fewer pixels are fetched than would be fetched if the PUs of the CU has a next-to-worst configuration (e.g., 8×8 bi-predicted PUs). Various methods of MV rounding are possible in order to reduce the worst case scenario. In other words, a video coder may implement various rounding methods to reduce the occurrence of the worst case scenario (i.e., the scenario where the maximum amount of data is transferred from memory in order to generate predictive blocks for PUs of a CU.) For example, inter-prediction processing unit 120 may round both MVs of a bi-directionally predicted PU. In another example, inter-prediction processing unit 120 may round only one MV of a bi-directionally predicted PU. In another example, inter-prediction processing unit 120 may round only one component (e.g., MVx or MVy) of either or both MVs of a bi-directionally predicted PU.

In another example, inter-prediction processing unit 120 may selectively round MV components of rectangular PUs based on the orientations of the rectangular PUs. In other words, for rectangular-shaped PUs, MV rounding can be dependent on PU orientation. A rectangular PU is a PU having rectangular (i.e., non-square) sample blocks. For instance, a rectangular PU may have an 8×4 or a 4×8 luma sample block. In one example, inter-prediction processing unit 120 may round only a vertical component of a MV (i.e., MVy) for a horizontally-oriented PU. In this example, inter-prediction processing unit 120 may round only a horizontal component of a MV (i.e., MVx) for a vertically-oriented PU. In some examples, video decoder 30 may also determine whether to round either or both components of a MV based on an orientation of a PU. Thus, a video coder may determine, based at least in part on the current PU having a particular size and an orientation of the current PU, whether to round at least one of the horizontal component or the vertical component of the motion vector from sub-pixel accuracy to integer-pixel accuracy.

In another example, inter-prediction processing unit 120 may round MV components in a crossing manner. That is, inter-prediction processing unit 120 may round an MVx component of a first MV of a PU and may round an MVy component of a second MV of the PU, or vice versa. In some examples, video decoder 30 may also round MV components in a crossing manner. Thus, a video coder may, in response to determining that a current PU has a particular size, round the horizontal component, but not the vertical component of a first motion vector from sub-pixel accuracy to integer-pixel accuracy and may round the vertical component, but not the horizontal component of a second motion vector of the current PU from sub-pixel accuracy to integer-pixel accuracy.

Table 1, below, indicates the number of pixels fetched when inter-prediction processing unit 120 uses various rounding techniques.

TABLE 1

| PU size | Method | Luma | Chroma | Interpolation filter pixels per luma sample |
| --- | --- | --- | --- | --- |
| HM6.0 8 × 4 and 4 × 8 | Worst case (8 × 4bi) | 15 × 11 * 2 | 7 × 5 * 2 * 2 | 14.7 |
| | Worst case (8 × 8bi) | 15 × 15 * 2 | 7 × 7 * 2 * 2 | 10.1 |
| | Round both MV | 8 × 4 * 2 | 7 × 5 * 2 * 2 | 6.4 |
| | Round one MV | 8 × 11 * 2 | 7 × 5 * 2 * 2 | 9.9 |

TABLE 1-continued

| PU size | Method | Luma | Chroma | Interpolation filter pixels per luma sample |
|---|---|---|---|---|
| | component PU oriented rounding | 15 × 4 * 2 | 7 × 5 * 2 * 2 | 8.1 |
| | Cross rounding | 15 × 4 + 8 × 11 | 7 × 5 * 2 * 2 | 9.0 |
| 8 × 8 | Worst case (16 × 8bi) | 23 × 15 * 2 | 11 × 7 * 2 * 2 | 7.8 |
| | Round both MVs | 8 × 8 * 2 | 7 × 7 * 2 * 2 | 5.1 |
| | Round one MV component | 15 × 8 * 2 | 7 × 7 * 2 * 2 | 6.8 |

Each rounding method indicated in Table 1 may be suitable for rounding of MVs of PUs having 4×8 or 8×4 luma blocks. However, in the next-worst case scenario (i.e., bi-predicted PUs with luma blocks of size 8×8), inter-prediction processing unit 120 may only use rounding of both MVs for PUs having luma blocks of size 4×8 or 8×4. Otherwise, the number of pixels fetched for PUs having luma blocks of size 4×8 or 8×4 may be greater than that for PUs having luma blocks of size 8×8. This can be seen from the last column of Table 1 in terms of the number of reference pixels fetched for interpolating each new pixel.

Some configurations of inter-prediction processing unit 120 may provide for a uniform design. For example, if the worst case scenario is 8×4 or 4×8, inter-prediction processing unit 120 may round both MVs of a PU or may round MVy components of both MVs of the PU. That is, addressing only the 8×4 or 4×8 worst case, rounding both MVs or rounding of MVy components of both MVs is performed. In another example, if the worst case scenario is bi-predicted PUs with luma blocks of size 8×8, inter-prediction processing unit 120 may round both MVs for PUs with luma blocks of size 4×8 or 8×4. Furthermore, in this example, inter-prediction processing unit 120 may round only the MVy component of both MVs of PUs with luma blocks of size 8×8. In other examples, the rounding techniques can be extended to PUs with luma blocks greater or smaller sizes than 8×8. For instance, inter-prediction processing unit 120 may round both MVs or only MVy components of MVs for PUs with luma blocks of size 4×4.

Assuming that the pixels are stored in a linear memory storage module, rounding MVy components may be more advantageous than rounding MVx components because rounding MVy components may reduce the number of fetched pixels more than rounding MVx components. This is because each read operation from memory may fetch a fixed amount of consecutive data (e.g., 64 consecutive pixels). However, when motion compensation unit 124 performs interpolation along a vertical axis, motion compensation unit 124 may only need a single pixel from the data fetched with a single read operation. In contrast, when motion compensation unit 124 performs interpolation along a horizontal axis, motion compensation unit 124 may use multiple pixels from the data fetched with a single read operation. Hence, motion compensation unit 124 may need to perform fewer read operations to perform interpolation along a horizontal axis than along a vertical axis. Consequently, when MVy is rounded to integer precision, motion compensation unit 124 may perform interpolation only along horizontal axes. In this way, the number of read operations performed by motion compensation unit 124 (and hence the amount of data fetched from memory) may be reduced by rounding MVy.

Figure 5C:
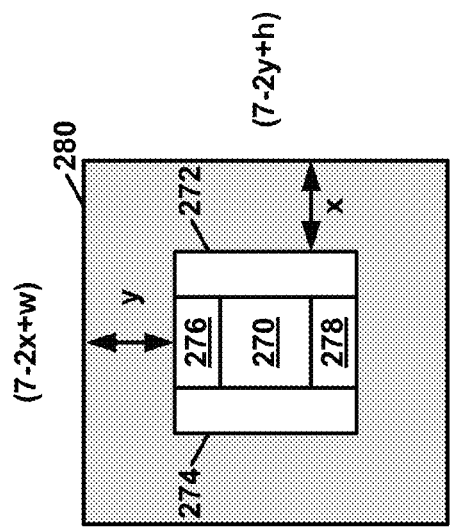
FIGS. 5A-5C are conceptual diagrams illustrating pixel padding, in accordance with one or more techniques of this disclosure.
Figure 5B:
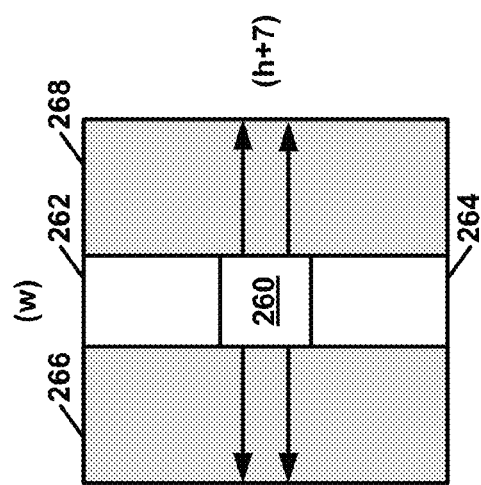
Figure 5A:
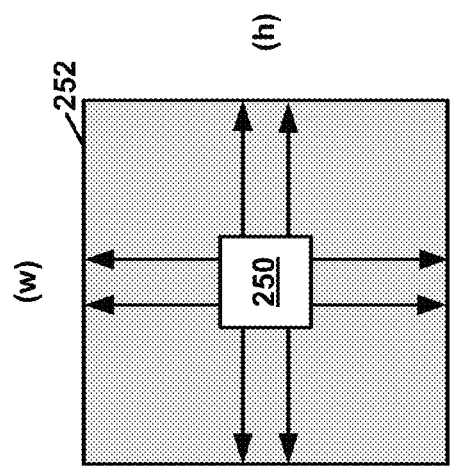

FIGS. 5A-5C are conceptual diagrams illustrating pixel padding, in accordance with one or more techniques of this disclosure. As an alternative to rounding MVs, pixel padding used in interpolation may reduce memory bandwidth requirements. That is, the memory bandwidth reduction achieved by MV rounding may be achieved by pixel padding for use in interpolation. As previously described with respect to FIG. 4, the block size to be fetched for interpolation was provided and MV rounding reduced the size of the block because no interpolation is performed due to integer-pixel MVs. When pixel padding is used, inter-prediction processing unit 120 does not round MVs. Rather, when a motion compensation unit (e.g., motion compensation unit 124 or motion compensation unit 164) determines a reference block for a current PU, the motion compensation unit may determine, based on a sub-pixel MV of the current PU, a block of integer-pixel samples in a reference picture. The motion compensation unit may then retrieve, from memory, the determined block of integer-pixel samples. The motion compensation unit may then generate integer-pixel padding samples based on integer-pixel samples at the edges of the retrieved block of integer-pixel samples. The motion compensation unit may use the integer-pixel padding samples to interpolate values of sub-pixel samples of a reference block indicated by the sub-pixel MV of the current PU. In examples where the motion compensation unit generates padding pixels, the interpolation operations may be the same as in HEVC Working Draft 6, but the input to the interpolation operations may be different.

The motion compensation unit may generate the integer-padding samples in various ways. As illustrated in the example of FIG. 5A, the motion compensation unit may retrieve a block of integer-pixel samples in an area 250 of a reference picture. In addition, the motion compensation unit may generate integer-pixel padding samples that extend in each direction from area 250. In other words, the motion compensation unit only fetches integer-pixel samples of area 250 corresponding to an integer-pixel MV and the motion compensation unit pads pixels by copying the boundary pixels in horizontal and vertical directions as depicted in a shaded area 252. Thus, in the example of FIG. 5A, the integer-pixel padding samples above the retrieved block may have values that match the values of integer-pixel samples in a top row of integer-pixel samples of the retrieved block, padding integer-pixel samples to the right of the retrieved block may have values that match the values of integer-pixel samples in a rightmost column of integer-pixel samples of the retrieved block, integer-pixel padding samples to the left of the retrieved block may have values that match the values of integer-pixel samples in a leftmost column of integer-pixel samples of the retrieved block, and integer-pixel padding samples below the retrieved block may have values that match the values of integer-pixel samples in a bottom row of integer-pixel samples of the retrieved block.

FIG. 5B is a conceptual diagram providing another example of pixel padding. In the example of FIG. 5B, the motion compensation unit may fetch, from memory, integer-pixel samples in area 260 and integer-pixel samples in areas 262, 264. The motion compensation unit may determine area 260 based on a MV of a PU. The integer-pixel samples in areas 262, 264 may be integer-pixel samples that the motion compensation unit uses for vertical interpolation. The motion compensation unit may generate integer-pixel padding samples for areas 266, 268 instead of retrieving the samples for areas 266, 268. The motion compensation unit may generate the integer-pixel padding samples for areas 266, 268 by copying integer-pixel samples along the left and right edges of area 260. Thus, in the example of FIG. 5B, the motion compensation unit may fetch only pixels necessary for vertical interpolation shown in areas 262, 264 and may pad pixels in areas 266, 268.

FIG. 5C is a conceptual diagram providing another example of pixel padding. In the example of FIG. 5C, the motion compensation unit may fetch integer-pixel samples in area 270 and inter-pixel samples in areas 272, 274, 276, and 278. The motion compensation unit may determine area 270 based on a MV of a PU. The motion compensation unit may determine areas 272, 274 based on a parameter x. Furthermore, the motion compensation unit may determine areas 276, 278 based on a parameter y. Parameters x and y may be expressed in terms of numbers of pixels. The motion compensation unit may generate integer-pixel padding samples instead of fetching integer-pixel samples in area 280. Thus, in the example of FIG. 5C, some areas specified by parameters x and y, in terms of number of pixels, where pixels need to be fetched for 2D (horizontal and vertical) interpolation, and pixels in the remaining area are padded.

Figure 6:
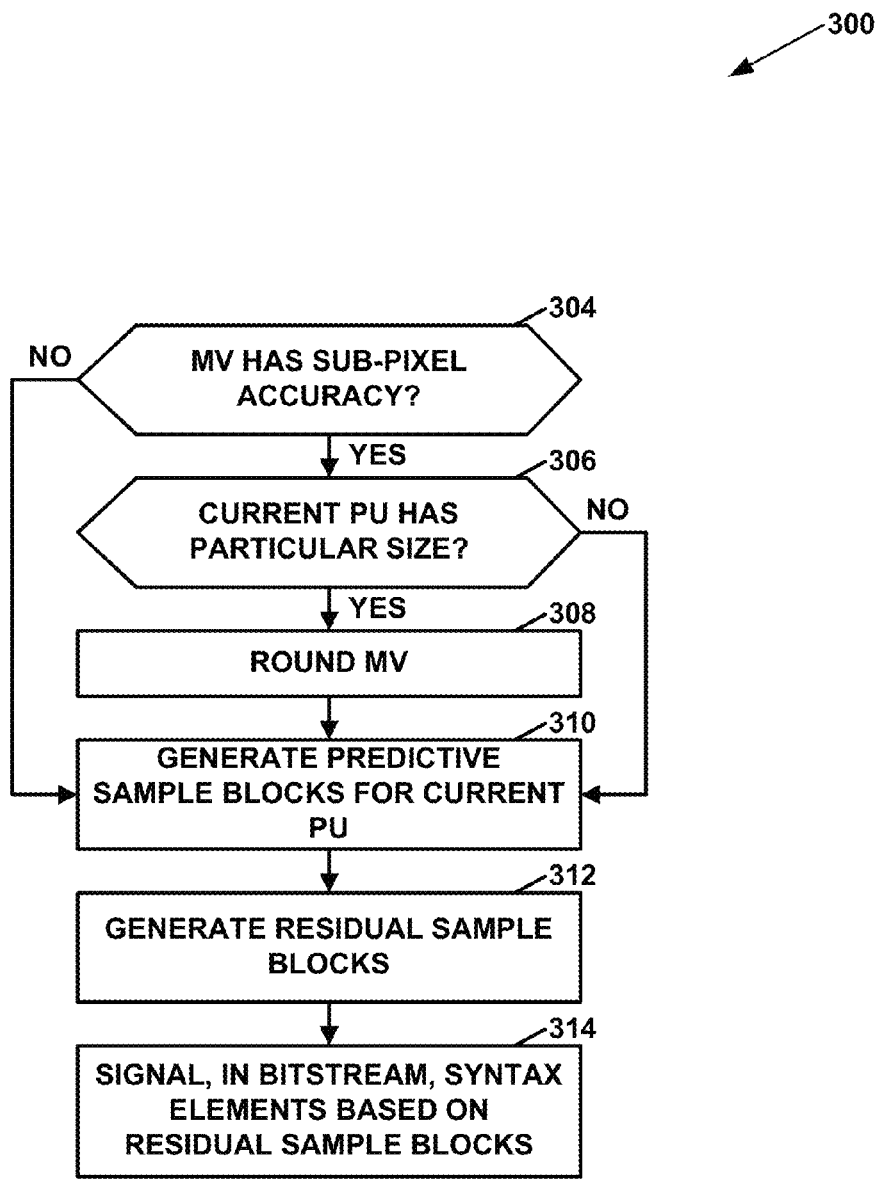
FIG. 6 is a flowchart illustrating an example operation of a video encoder, in accordance with one or more techniques of this disclosure.

FIG. 6 is a flowchart illustrating an example operation 300 of video encoder 20, in accordance with one or more techniques of this disclosure. In the example of FIG. 6, video encoder 20 may determine whether a MV has sub-pixel (i.e., sub-pixel) accuracy (304). In other words, video encoder 20 may determine whether a horizontal and/or a vertical component of the MV has sub-pixel accuracy. When the MV has sub-pixel accuracy ("YES" of 304), video encoder 20 may determine whether the current PU has a particular size (306). In some examples, video encoder 20 may determine whether the current PU has the particular size by determining whether the size of the current PU is less than a particular size threshold. Furthermore, in some examples, the particular size may be 4×8, 8×4, or smaller. In response to determining that the current PU has the particular size ("YES" of 306), video encoder 20 may round the MV (308). Rounding the MV may comprise rounding a horizontal and/or a vertical component of the MV from sub-pixel accuracy to integer-pixel accuracy. As described elsewhere in this disclosure, inter-prediction processing unit 120 may, in some examples, round the horizontal and/or vertical components of the MV. In other examples, motion compensation unit 124 may round the horizontal and/or vertical components of the MV during motion compensation.

In some examples, inter-prediction processing unit 120 may generate a merge candidate list. In this example, each candidate in the merge candidate list may specify a MV. The MVs specified by the candidates in the merge candidate list may include the MV of actions 304 and 306. After generating the merge candidate list, inter-prediction processing unit 120 may, in accordance with one or more the techniques of this disclosure, round MVs indicated by MV candidates in the merge candidate list from sub-pixel accuracy to integer-pixel accuracy. After rounding the MVs indicated by the MV candidates, inter-prediction processing unit 120 may prune duplicate MV candidates from the merge candidate list. Duplicate MV candidates may specify the same MVs and the same reference indices. A selected MV candidate in the merge candidate list may specify the motion vector of the current PU. In another example, inter-prediction processing unit 120 may generate a merge candidate list and may prune duplicate MV candidates from the merge candidate list. After pruning duplicate MV candidates from the merge candidate list, inter-prediction processing unit 120 may round MVs indicated by the MV candidates from sub-pixel accuracy to integer-pixel accuracy. A selected MV candidate in the merge candidate list may specify the MV for the current PU.

In another example, inter-prediction processing unit 120 may generate an AMVP candidate list for the current PU. After generating the AMVP candidate list, inter-prediction processing unit 120 may round MVs indicated by MV candidates in the AMVP candidate list from sub-pixel accuracy to integer-pixel accuracy. The MV of actions 304 and 306 may be among the MVs indicated by the MV candidates in the AMVP candidate list. After rounding the motion vectors indicated by the MV candidates, inter-prediction processing unit 120 may prune duplicate MV candidates from the AMVP candidate list and may signal, in the bitstream, a MVD that indicates a difference between the motion vector for the current PU and a motion vector indicated by a selected MV candidate in the AMVP candidate list. In a similar example, inter-prediction processing unit 120 may generate an AMVP candidate list for the current PU and may prune duplicate MV candidates from the AMVP candidate list. After pruning duplicate MV candidates from the AMVP candidate list, inter-prediction processing unit 120 may round motion vectors indicated by the MV candidates from sub-pixel accuracy to integer-pixel accuracy. Furthermore, inter-prediction processing unit 120 may signal, in the bitstream, a MVD that indicates a difference between the motion vector for the current PU and a motion vector indicated by a selected MV candidate in the AMVP candidate list.

After the MV has been rounded, or when the MV does not have sub-pixel accuracy ("NO" of 304), or when the current PU does not have the particular size ("NO" of 306), motion compensation unit 124 may generate, based at least in part on the MV, predictive sample blocks for the current PU (310). For example, if the MV is a selected MV in a merge candidate list, motion compensation unit 124 may generate, based at least in part on reference picture samples indicated by the selected MV candidate in the merge candidate list, the predictive sample block for the current PU. In another example, motion compensation unit 124 may determine the MV based on a MVD and a MV candidate in an AMVP candidate list and may determine, based at least in part on reference picture samples indicated by the MV, the predictive sample block for the current PU. In some examples, motion compensation unit 124 may generate a luma and two chroma predictive blocks for the current PU. Residual generation unit 102 of video encoder 20 may then generate residual blocks for the current CU (312). Video encoder 20 may signal, in a bitstream, syntax elements based on the residual sample blocks (314). For instance, video encoder 20 may apply a transform to residual samples of the residual sample blocks, quantize the resulting transform coefficients, generate syntax elements indicating the transform coefficients, entropy encode the syntax elements, and output the entropy-encoded syntax elements in the bitstream.

Figure 7:
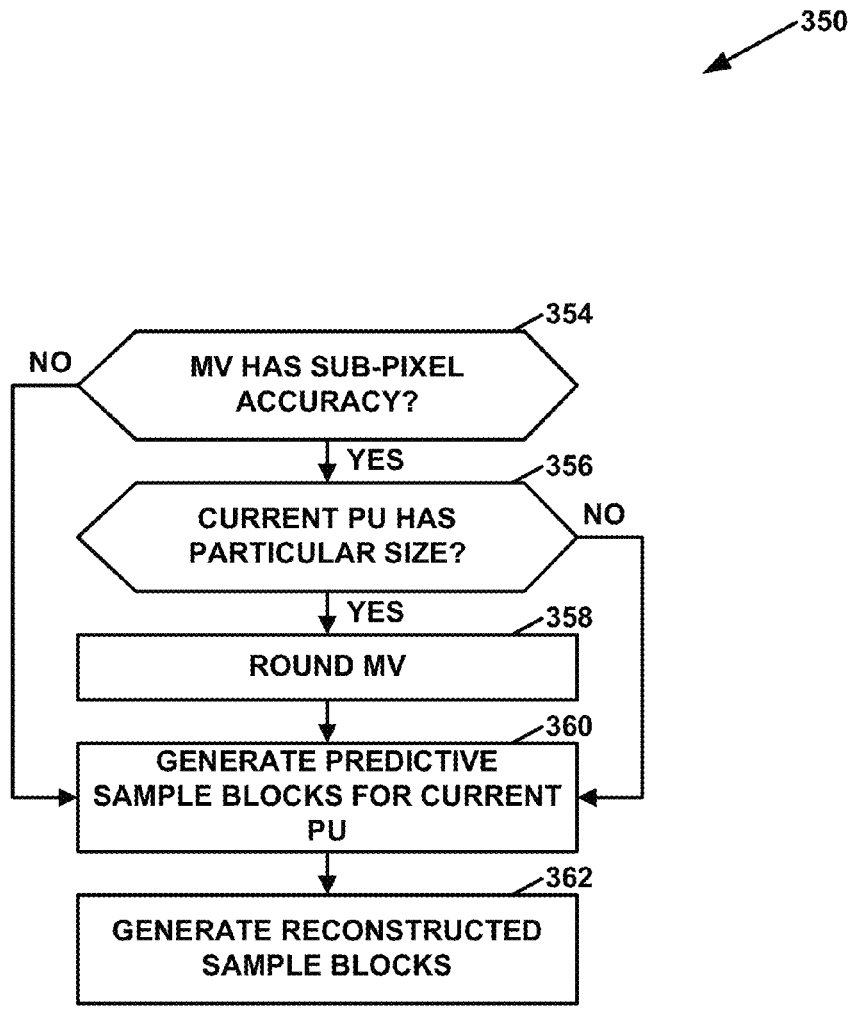
FIG. 7 is a flowchart illustrating an example operation of a video decoder, in accordance with one or more techniques of this disclosure.

FIG. 7 is a flowchart illustrating an example operation 350 of video decoder 30, in accordance with one or more techniques of this disclosure. The example of FIG. 7 may be applicable in implementations where video encoder 20 rounds one or more components of a MV during motion compensation and thus may signal sub-pixel or integer-pixel MVs for PUs.

In the example of FIG. 7, motion compensation unit 164 may determine whether a MV has sub-pixel accuracy (354). In other words, motion compensation unit 164 may determine whether a horizontal and/or a vertical component of the MV has sub-pixel accuracy. In one example, motion compensation unit 164 may generate a merge candidate list. In this example, the MV may be indicated by an MV candidate in the merge candidate list. In another example, motion compensation unit 164 may generate an AMVP candidate list. In this example, the MV may be indicated by a MV candidate in the AMVP candidate list. In another example, the MV may be equal to a sum of a MVD signaled for the current PU and a MV indicated by a selected candidate in the AMVP candidate list.

When the MV has sub-pixel accuracy ("YES" of 354), motion compensation unit 164 may determine whether the PU has a particular size (356). In some examples, motion compensation unit 164 may determine whether the current PU has the particular size by determining whether the size of the current PU is less than a particular size threshold. Furthermore, in some examples, the particular size may be 4×8, 8×4, or smaller. In response to determining that the current PU has the particular size ("YES" of 356), motion compensation unit 164 may round MV (358). Rounding the MV may comprise rounding a horizontal and/or a vertical component of the MV from sub-pixel accuracy to integer-pixel accuracy.

Furthermore, in one example, motion compensation unit 164 may generate a merge candidate list. In this example, each candidate in the merge candidate list may specify a motion vector. After generating the merge candidate list, motion compensation unit 164 may, in accordance with one or more the techniques of this disclosure, round motion vectors indicated by MV candidates in the merge candidate list from sub-pixel accuracy to integer-pixel accuracy. The MV may be among the MV indicated by the MV candidates in the merge candidate list. After rounding the motion vectors indicated by the MV candidates, inter-prediction processing unit 120 may prune duplicate MV candidates from the merge candidate list. Duplicate MV candidates may specify the same MVs and reference indices. A selected MV candidate in the merge candidate list may specify the motion vector of the current PU. In another example, motion compensation unit 164 may generate a merge candidate list and may prune duplicate MV candidates from the merge candidate list. After pruning duplicate MV candidates from the merge candidate list, motion compensation unit 164 may round motion vectors indicated by the MV candidates from the sub-pixel accuracy to the integer-pixel accuracy. A selected MV candidate in the merge candidate list may specify the motion vector for the current PU.

In another example, motion compensation unit 164 may generate an AMVP candidate list for the current PU. After generating the AMVP candidate list, motion compensation unit 164 may round motion vectors indicated by MV candidates in the AMVP candidate list from sub-pixel accuracy to integer-pixel accuracy. The motion vector may be among the motion vectors indicated by the MV candidates in the AMVP candidate list. After rounding the motion vectors indicated by the MV candidates, motion compensation unit 164 may prune duplicate MV candidates from the AMVP candidate list and may determine, based at least in part on an MVD and a motion vector indicated by a selected MV candidate in the AMVP candidate list, the motion vector for the current PU. In a similar example, motion compensation unit 164 may generate an AMVP candidate list for the current PU and may prune duplicate MV candidates from the AMVP candidate list. After pruning duplicate MV candidates from the AMVP candidate list, motion compensation unit 164 may round motion vectors indicated by the MV candidates from the sub-pixel accuracy to the integer-pixel accuracy. Motion compensation unit 164 may determine, based at least in part on a MVD and a motion vector indicated by a selected MV candidate in the AMVP candidate list, the motion vector for the current PU.

After rounding the MV, or when the MV does not have sub-pixel accuracy ("NO" of 354), or when the current PU does not have the particular size ("NO" of 356), motion compensation unit 164 may generate, based at least in part on the MV, predictive sample blocks for the current PU (360). For example, motion compensation unit 164 may determine a motion vector for the current PU based on the MV and a MVD. Furthermore, in this example, motion compensation unit 164 may determine, based on at least in part on reference picture samples indicated by the motion vector for the current PU, the predictive sample blocks for the current PU. In another example, motion compensation unit 164 may determine, based at least in part on reference picture samples indicated by the MV, the predictive sample blocks for the current PU. Motion compensation unit 164 may generate a luma and two chroma predictive blocks for the current PU. Video decoder 30 may generate, based at least in part on the sample blocks for the current PU, reconstructed sample blocks for the current CU (362).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   generating a candidate list for a current prediction unit (PU) of a coding unit (CU) of the video data, wherein the candidate list includes a list of motion vector (MV) candidates;
   pruning duplicate MV candidates from the candidate list, wherein the duplicate MV candidates indicate the same MV and indicate the same reference index;
   in response to determining that the current PU has a particular size, after pruning the duplicate MV candidates from the candidate list, rounding a motion vector indicated by a MV candidate in the candidate list, wherein rounding the motion vector comprises rounding at least one of a horizontal component or a vertical component of the motion vector from sub-pixel accuracy to integer-pixel accuracy;
   using the motion vector to generate a predictive sample block for the current PU; and
   generating, based in part on the predictive sample block for the current PU, a reconstructed sample block.

2. The method of claim 1, wherein the particular size is 4×8, 8×4, or smaller.

3. The method of claim 1, wherein the CU has multiple PUs, the method further comprising determining, based at least in part on the current PU having the particular size and a PU index of the current PU, whether to round the motion vector, wherein the PU index of the current PU indicates a position within the CU.

4. The method of claim 1, further comprising determining, based at least in part on the current PU having the particular size and an inter direction mode of the current PU, whether to round the motion vector.

5. The method of claim 1, further comprising determining, based at least in part on the current PU having the particular size and an orientation of the current PU, whether to round the motion vector.

6. The method of claim 1, wherein:
   the motion vector is a first motion vector indicated by the MV candidate;
   rounding the first motion vector indicated by the MV candidate comprises: in response to determining that the current PU has the particular size, rounding the horizontal component of the first motion vector indicated by the MV candidate, but not the vertical component of the first motion vector indicated by the MV candidate from sub-pixel accuracy to integer-pixel accuracy; and
   the method further comprises in response to determining that the current PU has the particular size, rounding a vertical component of a second motion vector indicated by the MV candidate, but not a horizontal component of the second motion vector indicated by the MV candidate, from sub-pixel accuracy to integer-pixel accuracy.

7. The method of claim 1, wherein the candidate list comprises a merge candidate list.

8. The method of claim 1, wherein the candidate list comprises an Advanced Motion Vector Prediction (AMVP) candidate list,
   the method further comprises:
      determining, based at least in part on a motion vector difference (MVD) and a motion vector indicated by a selected MV candidate in the AMVP candidate list, a motion vector for the current PU; and
      generating the predictive sample block comprises determining, based at least in part on reference picture samples indicated by the motion vector for the current PU, the predictive sample block for the current PU.

9. The method of claim 1, wherein:
   the rounded motion vector is a first rounded motion vector,
   rounding the motion vector comprises generating the first rounded motion vector by rounding at least one component of the motion vector to a next-higher integer value, and
   the method further comprises:
      generating a second rounded motion vector by rounding the at least one component of the motion vector to a next-lower integer value, the candidate list including a first and a second MV candidate that specify the first and second rounded motion vectors, respectively; and
      determining, based at least in part on a motion vector difference (MVD) and a motion vector indicated by a selected MV candidate in the candidate list, the motion vector for the current PU.

10. The method of claim 1, wherein rounding the motion vector comprises rounding both the horizontal and the vertical component of the motion vector from sub-pixel accuracy to integer-pixel accuracy.

11. The method of claim 1, wherein rounding the motion vector indicated by the MV candidate comprises:
   in response to determining the current PU is a vertically-oriented PU, rounding only the horizontal component of the motion vector; and
   in response to determining the current PU is a horizontally-oriented PU, rounding only the vertical component of the motion vector.

12. The method of claim 1, wherein:
   the current PU is a first PU of the CU,
   a second PU of the CU has one or more motion vectors with sub-pixel accuracy, and the method further comprises using the one or more motion vectors of the second PU to generate a predictive sample block for the second PU without rounding the one or more motion vectors of the second PU.

13. A method of encoding video data, the method comprising:
generating a candidate list for a current prediction unit (PU), wherein the candidate list comprises a list of motion vector (MV) candidates;
pruning duplicate MV candidates from the candidate list, wherein the duplicate MV candidates indicate the same MV and indicate the same reference index;
in response to determining that the current PU has a particular size after pruning the duplicate MV candidates from the candidate list, rounding a motion vector indicated by a MV candidate in the candidate list, wherein rounding the motion vector comprises rounding at least one of a horizontal component or a vertical component of the motion vector from sub-pixel accuracy to integer-pixel accuracy;
using the motion vector to generate a predictive sample block for the current PU;
generating, based in part on the predictive sample block for the current PU, a residual sample block; and
signaling, in a bitstream, the residual sample block.

14. The method of claim 13, wherein the particular size is 4×8, 8×4, or smaller.

15. The method of claim 13, wherein the CU has multiple PUs, the method further comprising determining, based at least in part on the current PU having the particular size and a PU index of the current PU, whether to round the motion vector, wherein the PU index of the current PU indicates a position within a coding unit (CU) of the current PU.

16. The method of claim 13, further comprising determining, based at least in part on the current PU having the particular size and an inter direction mode of the current PU, whether to round the motion vector from sub-pixel accuracy to integer-pixel accuracy.

17. The method of claim 13, further comprising determining, based at least in part on the current PU having the particular size and an orientation of the current PU, whether to round the motion vector from sub-pixel accuracy to integer-pixel accuracy.

18. The method of claim 13, wherein:
the motion vector indicated by the MV candidate is a first motion vector indicated by the MV candidate;
rounding the first motion vector indicated by the MV candidate comprises: in response to determining that the current PU has the particular size, rounding the horizontal component of the first motion vector indicated by the MV candidate, but not the vertical component of the first motion vector indicated by the MV candidate, from sub-pixel accuracy to integer-pixel accuracy; and
the method further comprises in response to determining that the current PU has the particular size, rounding a vertical component of a second motion vector indicated by the MV candidate, but not a horizontal component of the second motion vector indicated by the MV candidate, from sub-pixel accuracy to integer-pixel accuracy.

19. The method of claim 13, wherein the candidate list comprises a merge candidate list.

20. The method of claim 13, wherein the candidate list comprises an Advanced Motion Vector Prediction (AMVP) candidate list, and the method further comprises:
signaling, in the bitstream, a motion vector difference (MVD) that indicates a difference between a motion vector for the current PU and a motion vector indicated by a selected MV candidate in the AMVP candidate list.

21. The method of claim 13, wherein:
the rounded motion vector is a first rounded motion vector,
rounding the motion vector comprises generating the first rounded motion vector by rounding at least one component of the motion vector to a next-higher integer value, and
the method further comprises:
generating a second rounded motion vector by rounding the at least one component of the motion vector to a next-lower integer value, the candidate list including a first and a second MV candidate that specify the first and second rounded motion vectors, respectively; and
signaling, in the bitstream, an index of a selected MV candidate in the candidate list.

22. The method of claim 13, further comprising:
rounding either or both components of a MVD of the current PU to integer-pixel accuracy, and
the method further comprises signaling, in the bitstream, the rounded MVD of the current PU.

23. The method of claim 13, wherein rounding the motion vector comprises rounding both the horizontal and the vertical component of the motion vector from sub-pixel accuracy to integer-pixel accuracy.

24. The method of claim 13, wherein:
rounding the motion vector comprises rounding, during motion compensation, the motion vector; and
signaling, in the bitstream, a sub-pixel MVD of the current PU.

25. A video coding device comprising:
one or more data storage media configured to store video data; and
one or more processors configured to:
generate a candidate list for a current prediction unit (PU) of a coding unit (CU) of the video data, wherein the candidate list comprises a list of motion vector (MV) candidates;
prune duplicate MV candidates from the candidate list, wherein the duplicate MV candidates indicate the same MV and indicate the same reference index;
in response to determining that the current PU has a particular size, after pruning the duplicate MV candidates from the candidate list, round a motion vector indicated by a MV candidate in the candidate list such that at least one of a horizontal component or a vertical component of the motion vector is rounded from sub-pixel accuracy to integer-pixel accuracy; and
use the motion vector to generate a predictive sample block for the current PU.

26. The video coding device of claim 25, wherein the particular size is 4×8, 8×4, or smaller.

27. The video coding device of claim 25, wherein the CU has multiple PUs, and wherein the one or more processors are configured to determine, based at least in part on the current PU having the particular size and a PU index of the current PU, whether to round the motion vector from sub-pixel accuracy to integer-pixel accuracy, wherein the PU index of the current PU indicates a position within the CU.

28. The video coding device of claim 25, wherein the one or more processors are configured to determine, based at least in part on the current PU having the particular size and an inter direction mode of the current PU, whether to round the motion vector.

29. The video coding device of claim 25, wherein the one or more processors are configured to determine, based at least in part on the current PU having the particular size and an orientation of the current PU, whether to round the motion vector.

30. The video coding device of claim 25, wherein:
the motion vector is a first motion vector indicated by the MV candidate;
the one or more processors are configured to:
round, in response to determining that the current PU has the particular size, the horizontal component of the first motion vector indicated by the MV candidate, but not the vertical component of the first motion vector indicated by the MV candidate from sub-pixel accuracy to integer-pixel accuracy; and
round, in response to determining that the current PU has the particular size, a vertical component of a second motion vector indicated by the MV candidate, but not a horizontal component of the second motion vector indicated by the MV candidate, from sub-pixel accuracy to integer-pixel accuracy.

31. The video coding device of claim 25, wherein the candidate list comprises a merge candidate list.

32. The video coding device of claim 25, wherein the candidate list comprises an AMVP candidate list, and the one or more processors are configured to:
determine, based at least in part on a motion vector difference (MVD) and a motion vector indicated by a selected MV candidate in the AMVP candidate list, a motion vector for the current PU; and
determine, based at least in part on reference picture samples indicated by the motion vector for the current PU, the predictive sample block for the current PU.

33. The video coding device of claim 32, wherein the one or more processors are further configured to signal the MVD in a bitstream, wherein the MVD indicates a difference between the motion vector for the current PU and the motion vector indicated by a selected MV candidate in the AMVP candidate list.

34. The video coding device of claim 25, wherein:
the rounded motion vector is a first rounded motion vector, and
the one or more processors are configured to:
generate the first rounded motion vector by rounding at least one component of the motion vector to a next-higher integer value;
generate a second rounded motion vector by rounding the at least one component of the motion vector to a next-lower integer value the candidate list including a first and a second MV candidate that specify the first and second rounded motion vectors, respectively; and
determine, based at least in part on a MVD and a motion vector indicated by a selected MV candidate in the candidate list, a motion vector for the current PU.

35. The video coding device of claim 25, wherein:
the rounded motion vector is a first rounded motion vector, and
the one or more processors are configured to:
generate the first rounded motion vector by rounding at least one component of the motion vector to a next-higher integer value;
generate a second rounded motion vector by rounding the at least one component of the motion vector to a next-lower integer value, the candidate list including a first and a second MV candidate that specify the first and second rounded motion vectors, respectively; and
signal, in a bitstream, an index of a selected MV candidate in the candidate list.

36. The video coding device of claim 25, wherein the one or more processors are configured to round both the horizontal and the vertical component of the motion vector from sub-pixel accuracy to integer-pixel accuracy.

37. The video coding device of claim 25, wherein the one or more processors are further configured to:
generate, based in part on the predictive sample block for the current PU, a reconstructed sample block; and
output the reconstructed sample block for display.

38. The video coding device of claim 25, wherein the one or more processors are further configured to:
generate, based in part on the predictive sample block for the current PU, a residual sample block; and
signal, in a bitstream, the residual sample block.

39. The video coding device of claim 25, wherein the one or more processors are configured to:
round, during motion compensation, the motion vector; and
signal, in a bitstream, a sub-pixel MVD of the current PU.

40. The video coding device of claim 25, wherein the one or more processors are configured to:
round at least an x component or a y component of a MVD of the current PU; and
signal, in a bitstream, the rounded MVD of the current PU.

41. The video coding device of claim 25, wherein the video coding device comprises at least one of:
an integrated circuit;
a microprocessor; or
a wireless communication device.

42. The video coding device of claim 25, further comprising a display configured to display decoded video data, or a camera configured to capture the video data.

43. A video coding device comprising:
means for generating a candidate list for a current prediction unit (PU) of a coding unit (CU), wherein the candidate list comprises a list of motion vector (MV) candidates;
means for pruning duplicate MV candidates from the candidate list, wherein the duplicate MV candidates indicate the same MV and indicate the same reference index;
means for rounding, in response to determining that the current PU has a particular size, after pruning the duplicate MV candidates from the candidate list, a motion vector indicated by a MV candidate in the candidate list such that at least one of a horizontal component or a vertical component of a motion vector is rounded from sub-pixel accuracy to integer-pixel accuracy; and
means for using the motion vector to generate a predictive sample block for the current PU.

44. The video coding device of claim 43, further comprising:
means for generating, based in part on the predictive sample block for the current PU, a reconstructed sample block; and
means for outputting the reconstructed sample block for display.

45. The video coding device of claim 43, further comprising:
means for generating, based on the predictive sample block for the current PU, a residual sample block; and
means for signaling, in a bitstream, the residual sample block.

46. A non-transitory computer-readable storage medium having instructions stored thereon that, when executed, configure a video coding device to:

generate a candidate list for a current prediction unit (PU) of a coding unit (CU), wherein the candidate list comprises a list of motion vector (MV) candidates;

prune duplicate MV candidates from the candidate list, wherein the duplicate MV candidates indicate the same MV and indicate the same reference index;

round, in response to determining that the current PU has a particular size, after pruning the duplicate MV candidates from the candidate list, a motion vector indicated by a MV candidate in the candidate list such that at least one of a horizontal component or a vertical component of a motion vector is rounded from sub-pixel accuracy to integer-pixel accuracy; and use the motion vector to generate a predictive sample block for the current PU.

47. The non-transitory computer-readable storage medium of claim 46, wherein the instructions further configure the video coding device to:

generate, based in part on the predictive sample block for the current PU, a reconstructed sample block; and output the reconstructed sample block for display.

48. The non-transitory computer-readable storage medium of claim 46, wherein the instructions further configure the video coding device to:

generate, based in part on the predictive sample block for the current PU, a residual sample block; and signal, in a bitstream, the residual sample blocks.

* * * * *